United States Patent
Goussies et al.

(10) Patent No.: US 12,552,036 B2
(45) Date of Patent: Feb. 17, 2026

(54) OBJECT CLASSIFICATION SYSTEM AND/OR METHODS

(71) Applicant: Chef Robotics, Inc., San Francisco, CA (US)

(72) Inventors: Norberto A. Goussies, San Francisco, CA (US); Clement Creusot, San Francisco, CA (US); Rajat Bhageria, San Francisco, CA (US)

(73) Assignee: Chef Robotics, Inc., San Francisco, CA (US)

( * ) Notice: Subject to any disclaimer, the term of this patent is extended or adjusted under 35 U.S.C. 154(b) by 329 days.

(21) Appl. No.: 18/379,127

(22) Filed: Oct. 11, 2023

(65) Prior Publication Data

US 2024/0116183 A1    Apr. 11, 2024

Related U.S. Application Data

(60) Provisional application No. 63/415,063, filed on Oct. 11, 2022.

(51) Int. Cl.
| | |
|---|---|
| *B25J 9/16* | (2006.01) |
| *B25J 9/00* | (2006.01) |
| *G06F 18/24* | (2023.01) |
| *G06V 10/764* | (2022.01) |
| *G06V 10/774* | (2022.01) |
| *G06V 10/82* | (2022.01) |
| *G06N 3/0464* | (2023.01) |

(52) U.S. Cl.
CPC .......... *B25J 9/1687* (2013.01); *B25J 9/0093* (2013.01); *B25J 9/1697* (2013.01); *G06F 18/24765* (2023.01); *G06V 10/764* (2022.01); *G06V 10/774* (2022.01); *G06V 10/82* (2022.01); *G06N 3/0464* (2023.01)

(58) Field of Classification Search
None
See application file for complete search history.

(56) References Cited

U.S. PATENT DOCUMENTS

2017/0290345 A1* 10/2017 Garden .................... A21C 9/08
2024/0246240 A1*  7/2024 Teoh ..................... B65G 47/905

* cited by examiner

*Primary Examiner* — Leon Flores
(74) *Attorney, Agent, or Firm* — Jeffrey Schox; Evan Myers

(57) ABSTRACT

The method S100 can include: providing bowls within the workspace based on the assembly context S105; sampling sensor data for the workspace S110; detecting bowls based on the sensor data S120; determining a labeled training dataset S130; and training a classifier for the assembly context S140. However, the method S100 can additionally or alternatively include any other suitable elements.

13 Claims, 18 Drawing Sheets

OBJECT CLASSIFICATION SYSTEM AND/OR METHODS

CROSS REFERENCE TO RELATED APPLICATIONS

This application claims the benefit of U.S. Provisional Application No. 63/415,063, filed 11 Oct. 2022, which is incorporated herein in its entirety by this reference.

TECHNICAL FIELD

This invention relates generally to the robotic automation field, and more specifically to a new and useful bowl classification system and/or method in the robotic automation field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 3A:
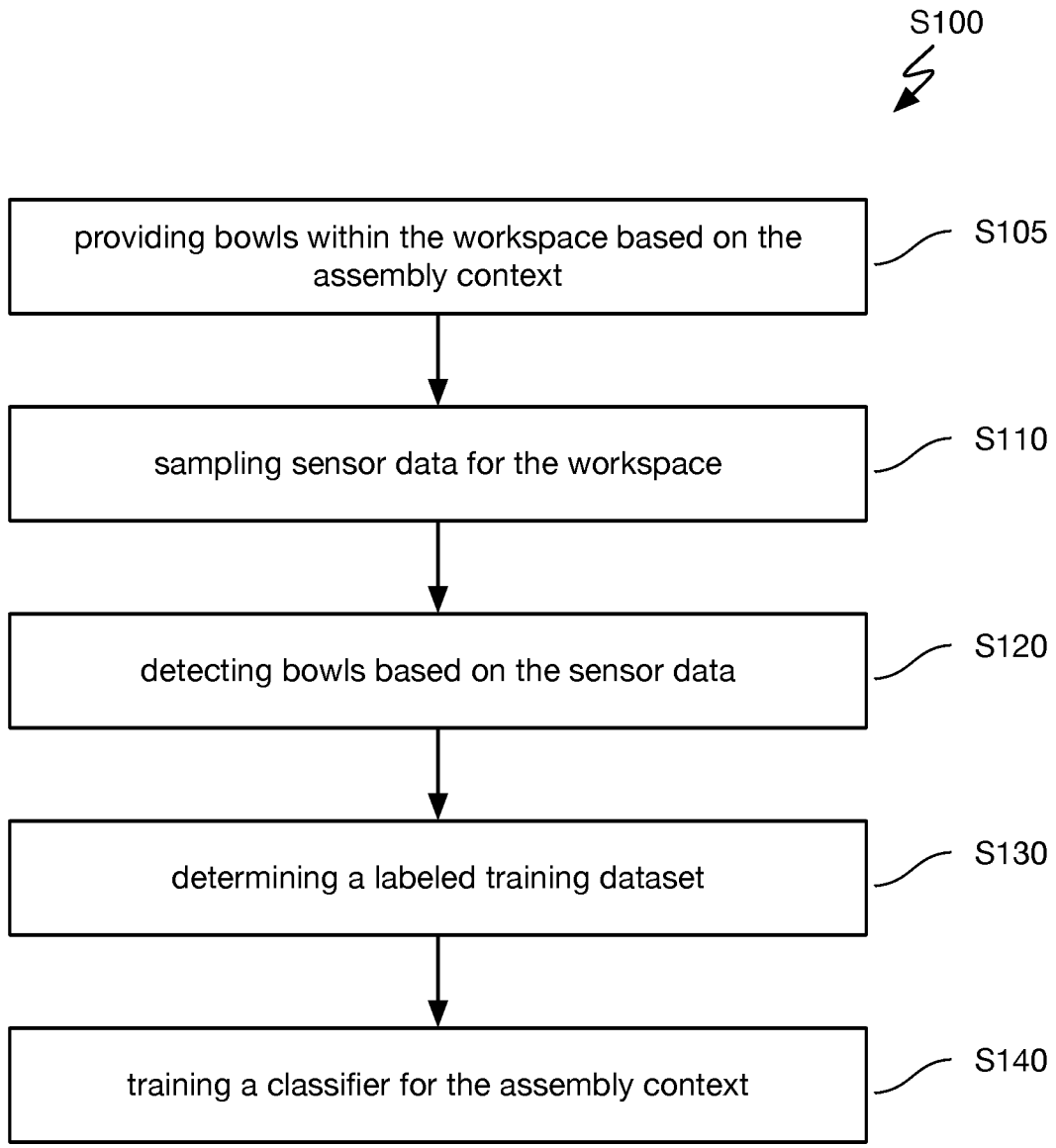
FIG. 3A is a flowchart diagram of a variant of the method.

The method S100, an example of which is shown in FIG. 3A, can include: providing bowls within the workspace based on the assembly context S105; sampling sensor data for the workspace S110; detecting bowls based on the sensor data S120; determining a labeled training dataset S130; and training a classifier for the assembly context S140. However, the method S100 can additionally or alternatively include any other suitable elements.

Figure 1:
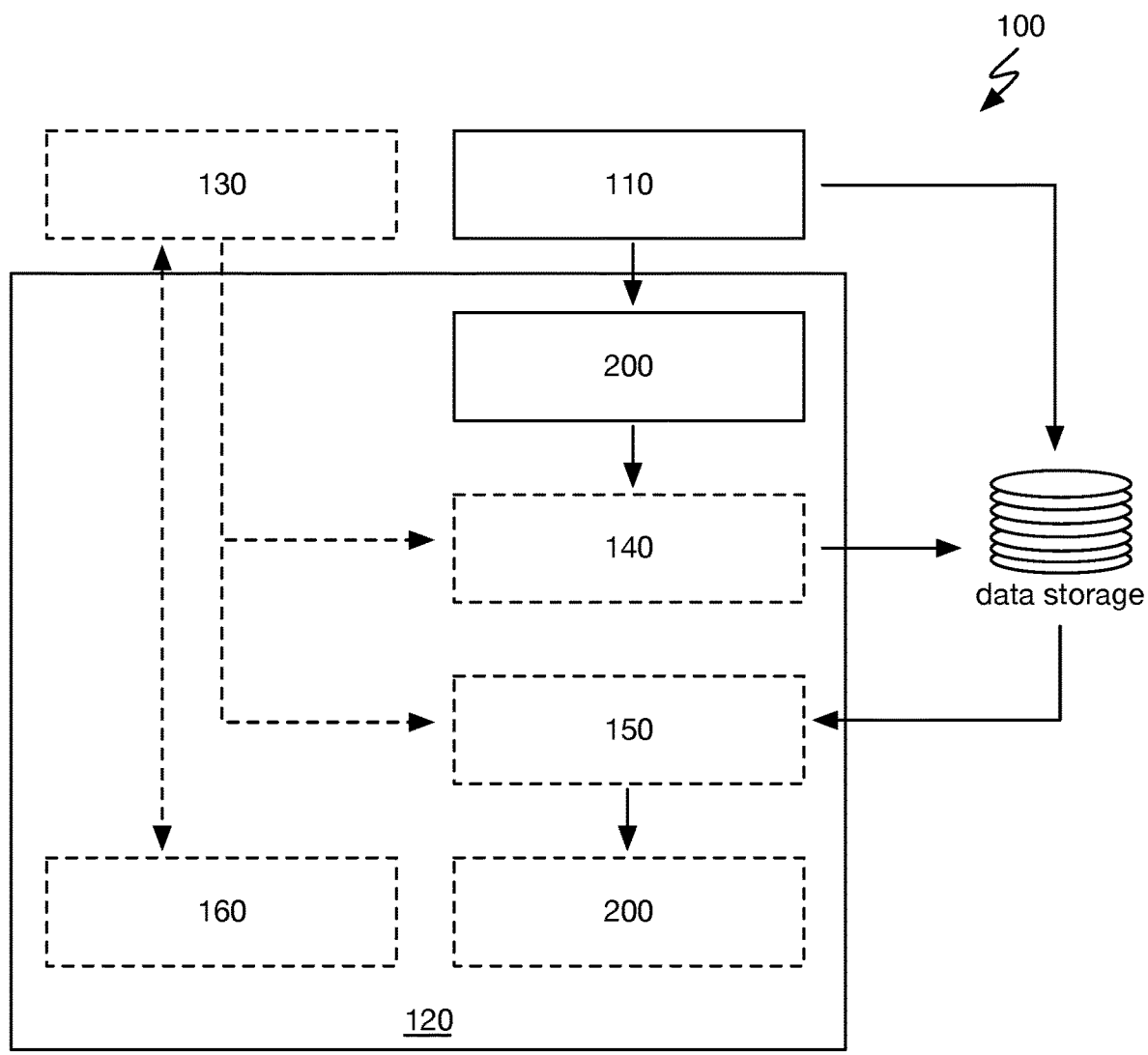
FIG. 1 is a schematic representation of a variant of the system.

The system 100, an example of which is shown in FIG. 1, can include an imaging system, a computing system, and an optional human machine interface (HMI). The computing system can include: a set of models (e.g., a bowl detector, a bowl classifier, etc.), an optional labeling module, an optional training module, an optional controller, and/or any other suitable computing modules. However, the system 100 can additionally or alternatively include any other suitable set of components. The system functions to facilitate execution of method S100. Additionally or alternatively, the system can function to generate labeled training data which can be used to train bowl-classification for a specific context (e.g., according to S100). Additionally or alternatively, the system can function to generate a trained bowl detector/classifier. Additionally or alternatively, the system can function to facilitate runtime classifications of bowls along an assembly line to facilitate robotic ingredient insertion, such as with the system and/or method(s) described in U.S. application Ser. No. 17/881,475, filed 4 Aug. 2022, which is incorporated herein in its entirety by this reference.

In some variants, the system can optionally include or be used with a robotic assembly system, such as a robotic pick and place system, gantry-style dispensing system, multi-axis robotic arm, and/or other robotic assembly system. In one variant, the system can include or be used in conjunction with the robotic foodstuff assembly system as described in U.S. application Ser. No. 17/881,475, filed 4 Aug. 2022, which is incorporated herein in its entirety by this reference. For example, the system 100 can train a classifier of the robotic foodstuff assembly system using labeled training images collected by the sensor(s) of the robotic foodstuff assembly system in the same arrangement as may be relied upon for runtime detection, which may facilitate in-situ training with the foodstuff assembly system is arranged in a particular location along a conveyor line. Alternatively, the system 100 can utilize separate sensors for generation of (auto-labeled) training images, and/or the robotic foodstuff assembly system can be reconfigured.

The system can optionally include or be used in conjunction with an industrial conveyor line or deployed in a high-throughput assembly application (e.g., airline food catering prep, etc.; continuously moving line; where a container throughput rate may exceed an insertion throughput rate of a robotic assembly module, etc.) such as in place of a human line worker. Additionally or alternatively, variants of the system and/or method can be implemented in a restaurant setting, such as a 'fast casual', 'ghost kitchen' or low-throughput application (e.g., without continuous operation; universities, K-12 schools, prisons, hotels, hospitals, factories, stadiums, entertainment venues, festivals, etc.). However, the system can alternatively be deployed in any suitable robotic assembly setting(s).

In variants, the system and/or method can be used to train bowl classification for multiple, independent (e.g., modular) robotic foodstuff assembly modules. In some examples, independent robotic foodstuff assembly modules may cooperatively operate and/or coordinate without requiring cross communication (e.g., between modules), cross calibration, and/or centralized control (e.g., at a central compute node coordinating between modules). In a specific example, a plurality of robotic assembly modules arranged along a single conveyor line may operate in absence of communication with each other and/or a central controller during ingredient planning and/or insertion (e.g., during an insertion interval). In variants, the system and/or method can be used in conjunction with the insertion planning system(s), controller, and/or method(s) as described in U.S. application Ser. No. 18/075,961, filed 6 Dec. 2022, which is incorporated herein in its entirety by this reference.

The term "bowl" as utilized herein can additionally or alternatively refer to containers (e.g., food container), trays (e.g., food trays, microwave trays, etc.), bins, and/or any other suitable bowls or other object(s), such as objects in a (conveyor) line assembly context. For instance, the terms "bowl detector" (and/or "bowl detection model") can likewise reference a container detector, container detection model, and/or any other suitable object detection model(s). Similarly, the term "bowl classifier" (and/or "bowl classification model") can likewise reference a container classifier, container classification model, and/or any other suitable object classification model(s). However, the term "bowl" can be otherwise suitably referenced herein. Additionally, it is understood that, in some variants, bowl detection/classification approaches herein may be generalized to any other suitable object detection problems and/or assembly contexts. For instance, variants can additionally or alternatively but use for detection and classification of the self-contained foods (i.e., food-based containers/bowls), such as bread-bowls, wraps, burritos, pizzas, and/or any other suitable self-contained food assemblies, and/or in any other suitable food-based or other detection contexts.

Additionally, containers can include a single food cavity/compartment (e.g., basin of a bowl), multiple food cavities/compartments, and/or can be otherwise configured. In such variants, food compartments can be labelled/classified collectively (e.g., as a single container) and/or individually (e.g., each classified as complete/incomplete, etc.).

The term "substantially" as utilized herein can mean: exactly, approximately, within a predetermined threshold or tolerance, and/or have any other suitable meaning.

1.1 Illustrative Examples

In one set of variants, a method for context-specific classification of containers along a conveyor line in an assembly context, the assembly context associated with a container appearance and a target ingredient for insertion into the containers, the context-specific classification comprising a binary classification of target ingredient presence within a respective container, can include: generating a set of context-specific training data for the assembly context by automatically labeling segmented image regions of containers with the binary classification according to a predetermined pattern; with the set of context-specific training data, training a context-specific classification model to predict the binary container state for containers in the assembly context; with the context-specific classification model, determining a set of binary container state predictions for identified containers in the assembly context; and based on the binary container state predictions, controlling a robot to insert the target ingredient into at least a subset of the identified containers.

Figure 9:
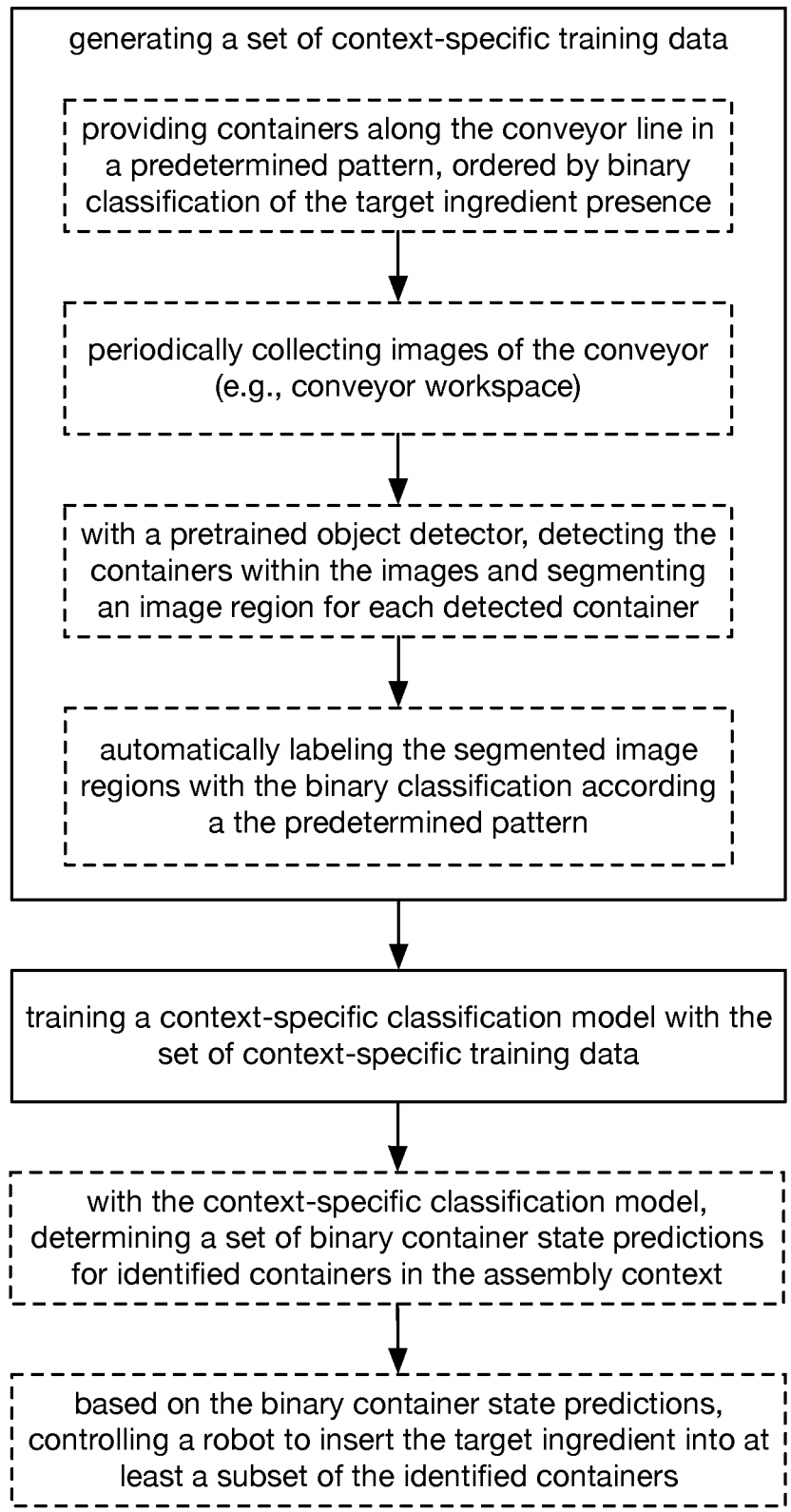
FIG. 9 is a flowchart diagram of a variant of the method.

In one variant (e.g., an example is shown in FIG. 9), generating a set of context-specific training data for the assembly context can include: providing containers along the conveyor line in a predetermined pattern, ordered by binary classification of the target ingredient presence, with an imaging system above the workspace, periodically collecting images of the workspace contemporaneously with a period of conveyor motion; with a pretrained object detector, detecting the containers within the images and segmenting an image region for each detected container; and automatically labeling the segmented image region for each detected container with the binary classification according to the predetermined pattern.

In an example, the predetermined pattern can include a predefined sequence of: a first set of containers, each defining at least a minimum separation distance to nearest respective neighbors at both container ends along an axis of conveyor motion; a second set of containers, each adjacent to a first nearest respective neighbor at a first end of the container along an axis of conveyor motion and defining at least the minimum separation distance to a second nearest respective neighbor at a second end opposite the first end; and a third set of containers, each adjacent to neighboring containers at both ends of the container along an axis of conveyor motion.

Figure 10:
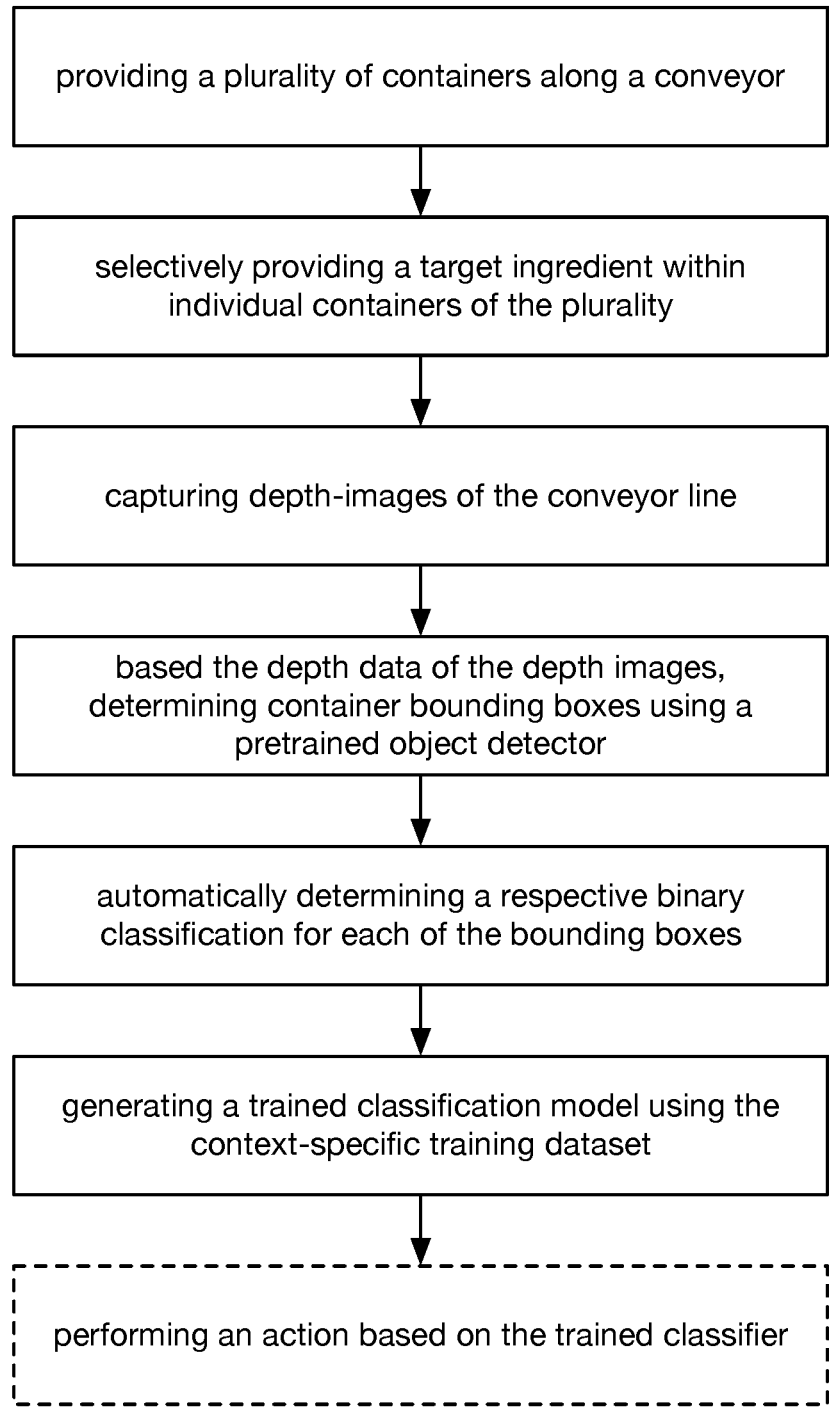
FIG. 10 is a flowchart diagram of a variant of the method.

In a second set of variants (e.g., an example is shown in FIG. 10), nonexclusive with the first, a method includes: contemporaneously with operation of a conveyor line, providing a plurality of containers along the conveyor line; selectively providing a target ingredient within individual containers of the plurality of containers according to a predetermined set of rules; capturing depth-images of the conveyor line; based on the depth data of the depth-images, determining a respective set of bounding boxes for containers detected within each depth-image using a pretrained object detector; based on the set of predetermined rules, automatically determining a respective binary classification for each of the bounding boxes; and automatically determining a context-specific training dataset comprising: at least a portion of the image data for each depth-image labeled with the respective set of bounding boxes and the respective binary classification for each of the bounding boxes; generating a trained classification model using the context-specific training dataset; and performing an action based on the trained classification model.

2. Benefits

Variations of the technology can afford several benefits and/or advantages.

First, variations of this technology can at least partially automate generation of labeled training data for various (recipe-specific) ingredients, which may facilitate training of respective bowl classifiers for various foodstuff assembly contexts of a conveyor line. For example, bowl classifiers can be used to determine if bowls have been served a particular ingredient of a recipe (e.g., where the classification output may be served or not served). In an illustrative example, training bowl measurements (e.g., images) can be labeled with known a priori information, such as whether a robot has placed the ingredient, which ingredient is associated with the robot, where the robot placed the ingredient (e.g., relative to a global workspace and/or relative to the bowl), a known bowl state (e.g., manually verified bowl state), and/or other information, wherein the model(s) can be trained to predict the labels based on the measurements. In variants, this can enable rapid training data generation, model training, and/or tuning at the edge (e.g., at the robot, at the facility, etc.). For instance, collecting images of bowls along a conveyor line (e.g., with predetermined/preestablished state classifications) may facilitate collection of many (e.g., tens, hundreds, thousands, etc.) of (auto-)labeled training images, specific to the assembly context, within a very short data collection window (e.g., minutes; which may reduce downtime and/or onboarding time for new recipes/skews).

Second, variations of this technology can utilize robust computer vision techniques (e.g., neural networks, YOLO object detectors, etc.) to facilitate container identification and/or classification which can be agnostic to variability in robot arrangement and/or workspace configurations. Variants can be agnostics to a variety of lighting conditions, container geometries (e.g., square bowls, round bowls, oblong bowls, plates, burritos; containers of arbitrary size and shape; etc.), conveyor line configurations (e.g., color, width, height, number of lanes; conveyors with guards for container alignment; indexed conveyors, continuous conveyors, stop-and-go conveyors, etc.), and/or other variability. Variants can additionally facilitate placement in containers with varied orientation/spacing along a conveyor line. As an example, such variants can allow accurate placement into containers which are automatically placed onto the line (e.g., automatically de-nested or dispensed onto a conveyor line; with predictable variability) and/or bowls which are arranged on a conveyor by a human (e.g., with unpredictable variability, etc.). Additionally, variants can improve classification accuracy in cases where ingredients may be visually similar, such as when a recipe includes multiple versions of a single ingredient (e.g., multiple types of corn with different spices, multiple sizes of carrot chunks, etc.).

Figure 6:
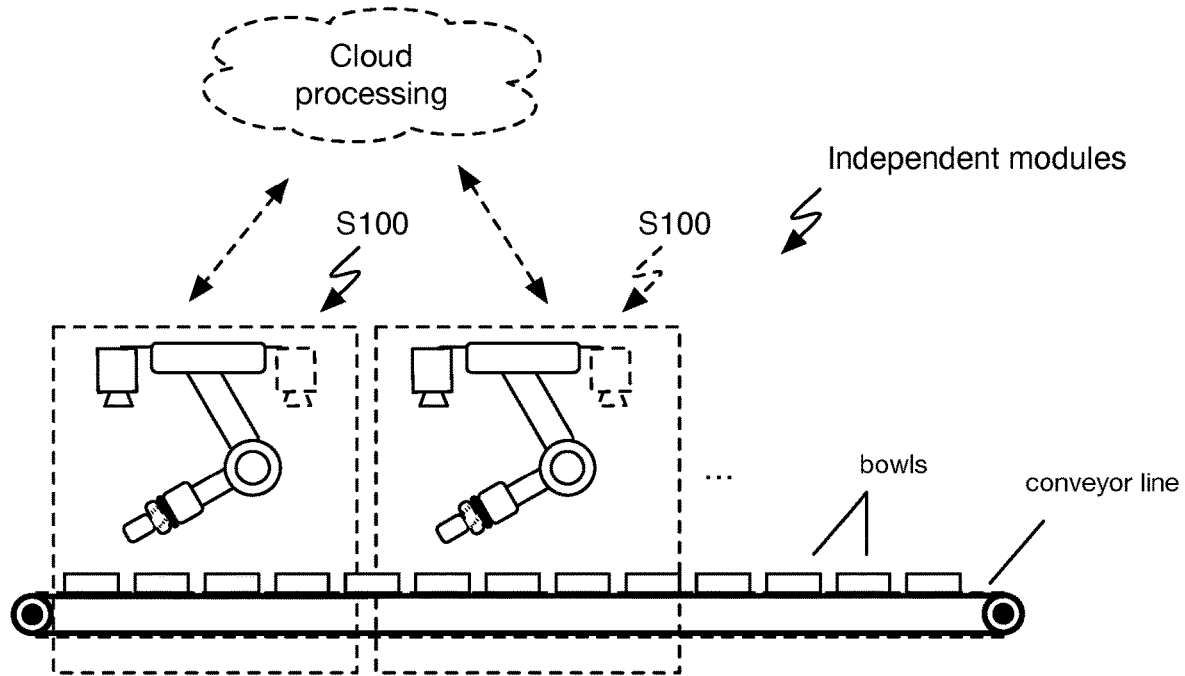
FIG. 6 is a diagrammatic example of a variant of the method.
Figure 7:
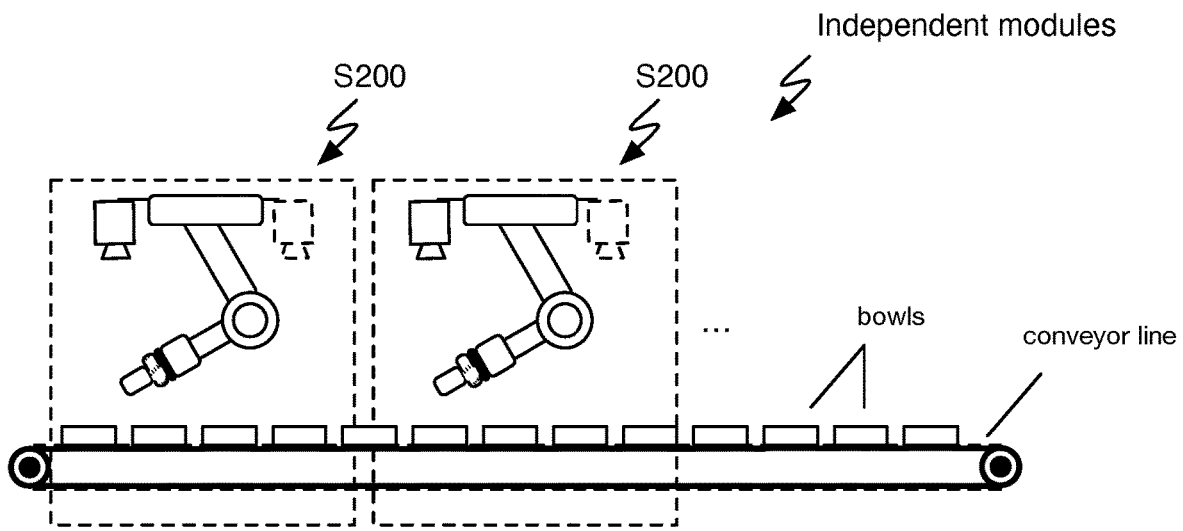
FIG. 7 is an example runtime execution of the method for a variant of the system.

Third, variations of this technology can enable the use of robotic foodstuff modules which may be electrically and/or communicatively decoupled (e.g., not in communication with) from a central controller and/or conveyor line controller (e.g., an example is shown in FIG. 6; a second example is shown in FIG. 7). Such variants can improve the reconfigurability and/or serviceability of modules along a conveyor line and/or may decrease the integration burden of deploying/reconfiguring the system(s). Additionally, such variants can facilitate throughput scaling with multiple, independent modules in series along a (high-throughput) conveyor line, each classifying containers and dynamically performing assembly operations (e.g., dynamic ingredient insertion into incomplete containers), such as by the system (s) and/or method(s) as described in U.S. application Ser. No. 18/075,961, filed 6 Dec. 2022, which is incorporated herein in its entirety by this reference.

Fourth, variations of the technology can provide technical solutions necessarily rooted in computer technology (e.g., automatic data collection, utilizing advanced models to detect/classify bowls from non-generic sensor datasets collected at a robotic assembly system, training/updating the computational models to improve detection/classification accuracy, etc.) to overcome issues specifically arising with computer technology (e.g., automate labeling to improve speed/accuracy when compared to hand-labeling; utilize large sets of context-specific data to improve single shot object detection/classification accuracy, etc.). Additionally, variants can reduce model training time and/or improve accuracy for ingredient-specific classification models, which may be beneficial in assembly settings with a high changeover rate of a recipe or assembly context (e.g., where multiple types of assemblies may be performed on the same line in a given day, such as with different ingredients and/or bowls). For instance, variants may facilitate edge data collection and/or model training for an ingredient specific model(s) (e.g., self train at a foodstuff assembly module via an HMI).

However, variations of the technology can additionally or alternately provide any other suitable benefits and/or advantages.

3. System

The system 100, an example of which is shown in FIG. 1, can include an imaging system 110, a computing system 120, and an optional human machine interface (HMI) 130. The computing system can include: a set of models 200 (e.g., a bowl detector, a bowl classifier, etc.), an optional labeling module 140, an optional training module 150, an optional controller 160, and/or any other suitable computing modules. However, the system 100 can additionally or alternatively include any other suitable set of components. The system functions to facilitate execution of method S100. Additionally or alternatively, the system can function to generate labeled training data which can be used to train bowl-classification for a specific context (e.g., according to S100). Additionally or alternatively, the system can function to generate a trained bowl detector/classifier. Additionally or alternatively, the system can function to facilitate runtime classifications of bowls along an assembly line to facilitate robotic ingredient insertion, such as with the system and/or method(s) described in U.S. application Ser. No. 17/881, 475, filed 4 Aug. 2022, which is incorporated herein in its entirety by this reference.

The system 100 can include an imaging system, which preferably functions to capture images of objects (e.g., food containers) within a workspace of the system, such as a workspace along a conveyor line. Additionally or alternatively, the imaging system can function to provide imaging data to the object detector in accordance with Block S110 of the method. Additionally or alternatively, the imaging system can provide images which can be (auto-)labeled and used for training of the classification system in accordance with method Block S200. The imaging system can include: conveyor line cameras (e.g., integrated into the conveyor line and/or arranged adjacent to the conveyor line; oriented toward bowls and/or a workspace along the conveyor line). The imaging system preferably includes 2D RGB cameras, depth imaging cameras, stereo camera pairs, CCD cameras, CMOS cameras, time-of-flight sensors (e.g., Lidar scanner, etc.), range imaging sensors (e.g., stereo triangulation, sheet of light triangulation, structured light scanner, time-of-flight, interferometry, etc.), and/or any other suitable sensors. In variants, the imaging system can collect sensor data which can include: RGB images (e.g., 2D), depth images (e.g., pixel aligned with the RGB, wherein the RGB image and the depth image can be captured by the same or different sensor sets), 3D imaging data, 3D representations (e.g., point cloud, 3D model, etc.). In a variants, the imaging system can determine a first set of 3D sensor data—which can be used for bowl detection during S120—and a second set of 2D sensor data (e.g., RGB data and/or RGB-d data)—which can be labeled (e.g., in accordance with S130) and use to train a context specific bowl classifier in accordance with Block S140. Additionally or alternatively, 2D sensor data generated by the imaging system can be used for object classification and insertion planning during runtime operation Imaging sensors are preferably calibrated within a common coordinate frame (i.e., sensor coordinate frame calibrated to a relative arrangement of the conveyor line and the robotic assembly module) in a fixed/predetermined arrangement relative to a (joint) coordinate frame of a robot assembly module, but can be otherwise suitably configured. For example, imaging sensors can be registered to a particular machine configuration and/or environmental setting (e.g., live/in-situ registration), such as by the process(es) described in U.S. application Ser. No. 17/881,475, filed 4 Aug. 2022, which is incorporated herein in its entirety by this reference.

However, the system can alternatively include or be used in conjunction with any other suitable imaging system(s); or the system can altogether exclude an imaging system.

Computing system functions to facilitate auto-labeling of training data and/or generation of a trained bowl classifier by the method S100. Additionally or alternatively, the computing system can function to perform runtime execution of S200. Additionally or alternatively, the computing system can function to perform various method elements and/or subprocesses. The computing system and/or processing modules thereof can be centralized, distributed, local (e.g., onboard a robotic assembly module; edge computing; etc.), remote (e.g., include remote processors offboard a robotic assembly module and/or cloud processing elements), and/or include any other suitable processing elements/modules. The computing system can include: an object detector, an optional bowl classifier, an optional labeling module, an optional training module, an optional controller, and/or any other suitable computing modules.

The computing system can include and/or execute a set of models, which functions to facilitate execution of the method (e.g., in training and/or inference). The set of models can include an object detection model (a.k.a., bowl detector), an object classification model (a.k.a., bowl classifier), and/or any other suitable model(s).

The models can include classical or traditional approaches, machine learning approaches, and/or be otherwise configured. The models can include regression (e.g., linear regression, non-linear regression, logistic regression, etc.), decision tree, LSA, clustering, association rules, dimensionality reduction (e.g., PCA, t-SNE, LDA, etc.), neural networks (e.g., CNN, DNN, CAN, LSTM, RNN, encoders, decoders, deep learning models, transformers, etc.), ensemble methods, optimization methods, classification, rules, heuristics, equations (e.g., weighted equations, etc.), selection (e.g., from a library), regularization methods (e.g., ridge regression), Bayesian methods (e.g., Naive Bayes, Markov), instance-based methods (e.g., nearest neighbor), kernel methods, support vectors (e.g., SVM, SVC, etc.), statistical methods (e.g., probability), comparison methods (e.g., matching, distance metrics, thresholds, etc.), deterministics, genetic programs, and/or any other suitable model. The models can include (e.g., be constructed using) a set of input layers, output layers, and hidden layers (e.g., connected in series, such as in a feed forward network; connected with a feedback loop between the output and the input, such as in a recurrent neural network; etc.; wherein the layer weights and/or connections can be learned through training); a set of connected convolution layers (e.g., in a CNN); a set of self-attention layers; and/or have any other suitable architecture.

Models can be trained, learned, fit, predetermined, and/or can be otherwise determined. The models can be trained or learned using: supervised learning, unsupervised learning, self-supervised learning, semi-supervised learning (e.g., positive-unlabeled learning), reinforcement learning, transfer learning, Bayesian optimization, fitting, interpolation and/or approximation (e.g., using gaussian processes), backpropagation, and/or otherwise generated. The models can be learned or trained on: labeled data (e.g., data labeled with the target label; auto-labeled training data, such as the context-specific training dataset), unlabeled data, positive training sets (e.g., a set of data with true positive labels), negative training sets (e.g., a set of data with true negative labels), and/or any other suitable set(s) of data.

Any model can optionally be validated, verified, reinforced, calibrated, or otherwise updated based on newly received, up-to-date measurements; past measurements recorded during the operating session; historic measurements recorded during past operating sessions; auto-labeled measurements; or be updated based on any other suitable data.

For example, the model(s) and/or subelements thereof can be trained and/or updated using auto-labeled training dataset (s) (e.g., specific to an assembly context)

Any model can optionally be run or updated: once; at a predetermined frequency; every time the method is performed; every time an unanticipated measurement value is received; or at any other suitable frequency. Any model can optionally be run or updated: in response to determination of an actual result differing from an expected result; or at any other suitable frequency. Any model can optionally be run or updated concurrently with one or more other models, serially, at varying frequencies, or at any other suitable time.

The set of models can include an object detector which functions to detect bowls within the workspace. Additionally or alternatively, the object detector functions to execute Block S120. The object detector is preferably a 3D object detector which receives 3D representations from the imaging system as an input and generates a pose estimate as an output. The object detector is preferably generalized/global to detect and/or generate pose estimates for bowls of arbitrary shapes/sizes (e.g., based on the object geometry). In variants, the object detector can be a neural network (NN) object detector which can include a convolutional neural network [CNN] based object detector, cascade neural network, YOLO network, single shot multiBox detector (SSD), single-shot refinement neural network, and/or any other NN-based object detector. Additionally or alternatively, the object detector can be a non-neural network based object detector (e.g., feature and/or geometry based detector) and/ or any other suitable object detector.

In variants, the object detector is preferably pretrained and/or predetermined (e.g., prior to execution of S100), but can additionally or alternatively be updated (e.g., via wireless updates from a remote or cloud processor, based on subsequent data collection, etc.) with any suitable frequency/timing. The object detector is preferably generalized (e.g., not specific to a particular assembly context, trained based on a variety of assembly contexts, etc.), but can be otherwise implemented.

The set of models can optionally include and/or be used to train a bowl classifier which functions to facilitate classification of bowls in a specific assembly context. The bowl classification model is preferably trained in accordance with Block S140, but can additionally or alternatively be at least partially pre-trained and/or updated with any other suitable timing. The bowl classifier is preferably a 2D classifier which receives 2D image data (e.g., RGB) and/or RGB-depth image data from the imaging system as an input and generates a classification (e.g., binary classification: 'complete' or 'incomplete'; multi-class classification 'needs rice+ ingredient', 'needs ingredient', 'complete', etc.). The bowl classifier can include integrated object detection (e.g., integrated detection and classification; the bowl classifier output an object pose estimate and an object classification) and/or can be used with a separate object detector (e.g., same as 3D object detector, different object detector, etc.). In variants, the bowl classifier can be a neural network classifier which can include a: CNN, FCN, RNN, YOLO, SSD, single-shot refinement neural network, and/or any other suitable classifier/detector model. Additionally or alternatively, the bowl classifier can include: a dynamic object classifier, static object classifier, a binary classifier, a multi-class classifier, and/or any other suitable classifier and can additionally or alternatively be performed with any or all of: computer vision techniques, machine learning models (e.g., generative, discriminative, etc.), object segmentation techniques, point cloud clustering, neural networks (e.g., pretrained to identify a specific set of objects—such as cars or pedestrians—based on the received inputs, etc.; convolutional neural network [CNN], fully convolutional network [FCN], etc.), object detectors/classifiers (e.g., You Only Look Once [YOLO] algorithm; non-neural net approaches such as Histogram of Oriented Gradients [HOG] and/or Scale-Invariant Feature Transform [SIFT] feature detectors, etc.), object trackers, and/or any other suitable elements.

However, the system can include or be used with any other suitable bowl classifier(s).

In a first variant, the set of models can include a generalized object detector (e.g., 3D object detector which receives depth imaging data; pretrained without auto-labeled training data). For example, a generalized object detector (e.g., YOLO detector, such as DetectNet) can be used for auto-labeling and/or training in accordance with S100. Additionally, a generalized object detector can provide inputs to a context-specific classification model/head.

In a second variant, the set of models can include an integrated object detector/classifier, such as a detector network backbone (e.g., SSD backbone; YOLO) and classification head (e.g., ResNet), co-trained using auto-labeled training data.

In a third variant, the set of models can include a (pre-trained) network backbone (e.g., CNN) with a context-specific classification head (e.g., trained separately/specifically using context-specific and/or auto-labeled training data). For example, the backbone can be pretrained with a generalized set of training data, wherein the generalized set of training data and the set of context-specific training data used to train the classification head are disjoint.

In a fourth variant, the set of models can optionally include a generalized classifier (e.g., not context specific), such as a classification subnetwork/head which is pretrained to determine a binary classification based on single shot image comparison. For example, the generalized classifier can be a Siamese neural network and/or any other suitable generalized classifier.

Figure 8:
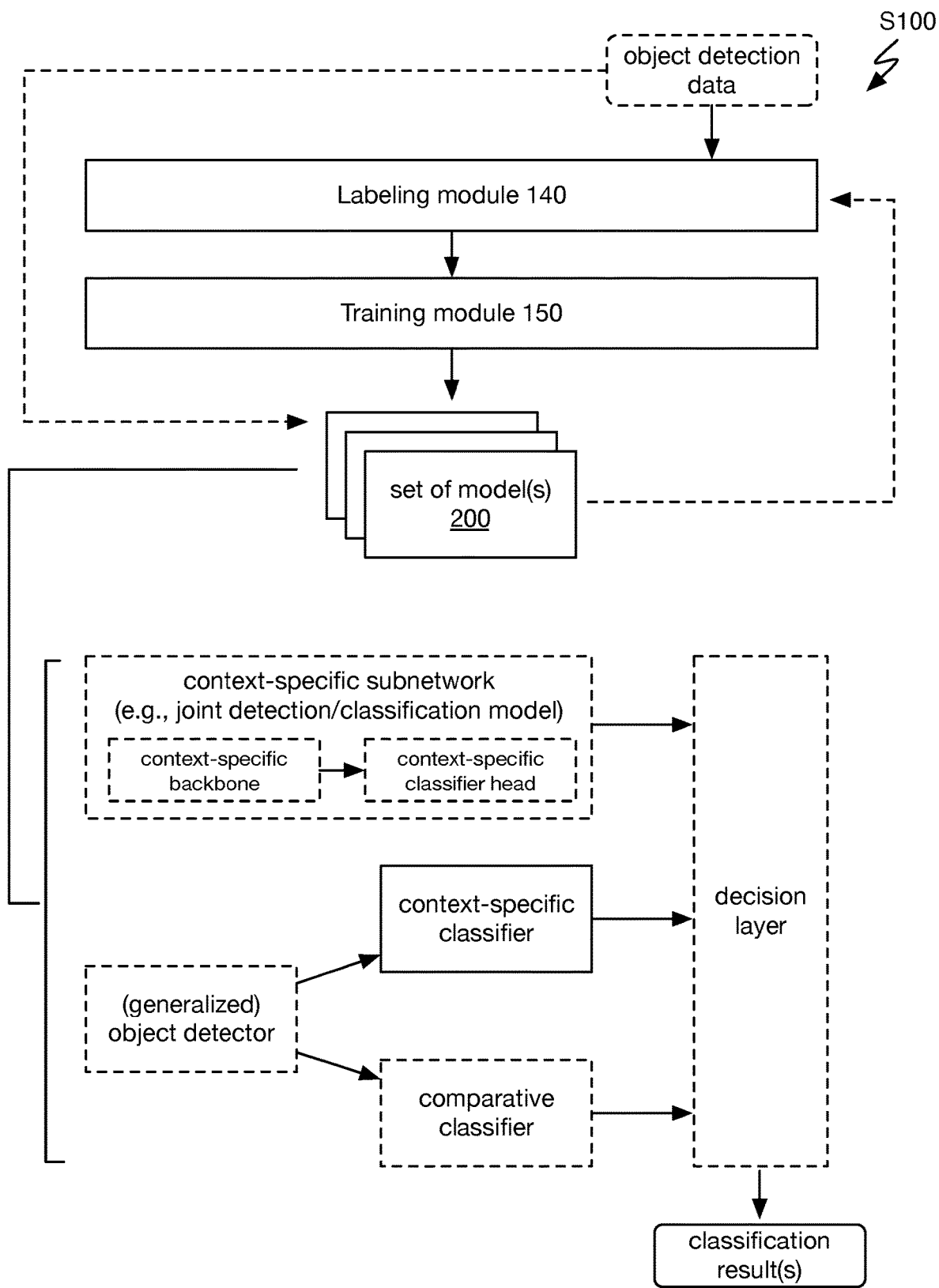
FIG. 8 is a flowchart diagram of a variant of the method.

In a fifth variant, the set of models can include any suitable combination/permutations of the first, second, third, and/or fourth variants. As a first example, a context-specific classification model can include an ensemble of neural network classifiers. In a second example, the set of models can include a decision layer which determines a classification result (e.g., for each object detection; binary classification probability) from a plurality of classification model inputs (e.g., an example is shown in FIG. 8). In a third example, the set of models can include at least one context-specific classification head (e.g., trained via S100).

Preferably, at least one model is at least partially trained using auto-labeled (context-specific) training data. However, one or more models can additionally or alternatively be trained/updated by bootstrapping, and/or other technique(s).

In one example, a context-specific classification model includes: a first neural network model comprising a first convolutional neural network (CNN) backbone with a first classification head; a second neural network model comprising a second CNN backbone with a second classification head; and a third neural network model, wherein training the context-specific classification model comprises updating weights of the first CNN backbone, first classification head, and second classification head based on the context-specific training data.

In one example, a context-specific classification model includes a first neural network classification head, trained with the context specific training data, and a second classification subnetwork which is pretrained to determine a second binary container state prediction for each of the set of containers based on single shot image comparison.

In one example, a generalized, pretrained object detector is configured to detect the containers using depth imaging data, wherein the context-specific classification model is trained with 2D images (e.g., context specific detection and/or classification may not rely upon depth-imaging data).

However, the system can include or be used with any other suitable set of model(s).

In variants, the computing system can include an optional labeling module which functions to execute Block S130 of the method. In variants, the computing system can include an optional training module which functions to execute Block S140 of the method. In variants, the computing system can include an optional controller which functions to execute Block S200 of the method.

However, the system can include any other suitable computing modules and/or altogether exclude one or more computing modules in some configurations/implementations (e.g., training, runtime, etc.)

The optional human machine interface (HMI) function to facilitate entry of manual inputs and/or user feedback during one or more method subprocesses. In variants, the HMI can include the HMI system(s) and/or processes as described in U.S. application Ser. No. 17/881,475, filed 4 Aug. 2022, which is incorporated herein in its entirety by this reference. However, the system can include any other suitable HMI.

However, the system can include any other suitable components.

4. Method

The method S100, an example of which is shown in FIG. 3A, can include: providing bowls within the workspace based on the assembly context S105; sampling sensor data for the workspace S110; detecting bowls based on the sensor data S120; determining a labeled training dataset S130; and training a classifier for the assembly context S140. However, the method S100 can additionally or alternatively include any other suitable elements.

Providing bowls within the workspace based on the assembly context S105 function to facilitate data generation and/or determination of an (auto-)labeled training dataset. Bowls are preferably provided manually by a user/operator in a predetermined configuration, such as may be directed by the HMI, but can additionally or alternatively be provided automatically, during normal operation of a conveyor line (e.g., observing bowls during normal, manual assembly; contemporaneously with line operation), based on an instruction/request from an HMI (e.g., directing a user to provide bowls in a predetermined pattern/configuration), based on operation of a conveyor line (e.g., where bowls are conveyed into the workspace of the system by movement of the conveyor line), based on operation of a robotic assembly system (e.g., selectively inserting foodstuff within bowls, such as according to the predetermined pattern/arrangement), and/or can be otherwise provided. For instance, the HMI can instruct a user to manually provide bowls in a predetermined configuration (e.g., in a target 'completed' configuration and/or an 'incomplete' configuration prior to insertion of an ingredient associated with the assembly context; with substantially standardized ingredients and/or ingredient arrangements used in the assembly context) at a position along the conveyor line. Additionally or alternatively, bowls can be provided in a predetermined pattern or arrangement based on the ingredient type(s) and/or configuration (e.g., examples are shown in FIGS. 4A-4H). Additionally or alternatively, S105 can include selectively providing the target ingredient within individual bowls (e.g., such as by controlling a robot to insert the target ingredient according to the predetermined set of rules; at the HMI directing to manually provide the target ingredient with specific bowls/groups, etc.).

Figure 4A:
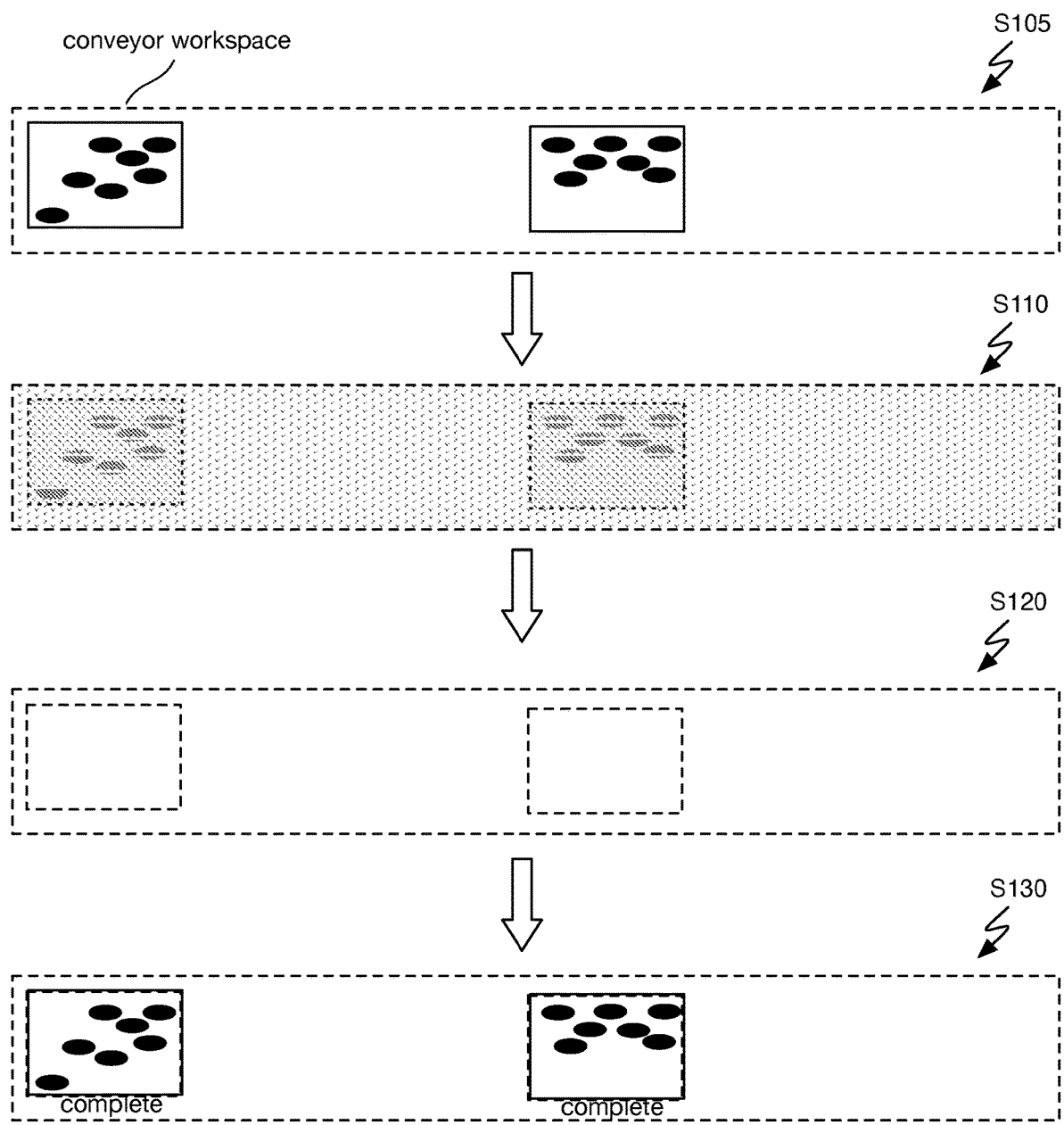
FIGS. 4A-4H are partial examples of auto-labeling in a one or more variant of the method.
Figure 4B:
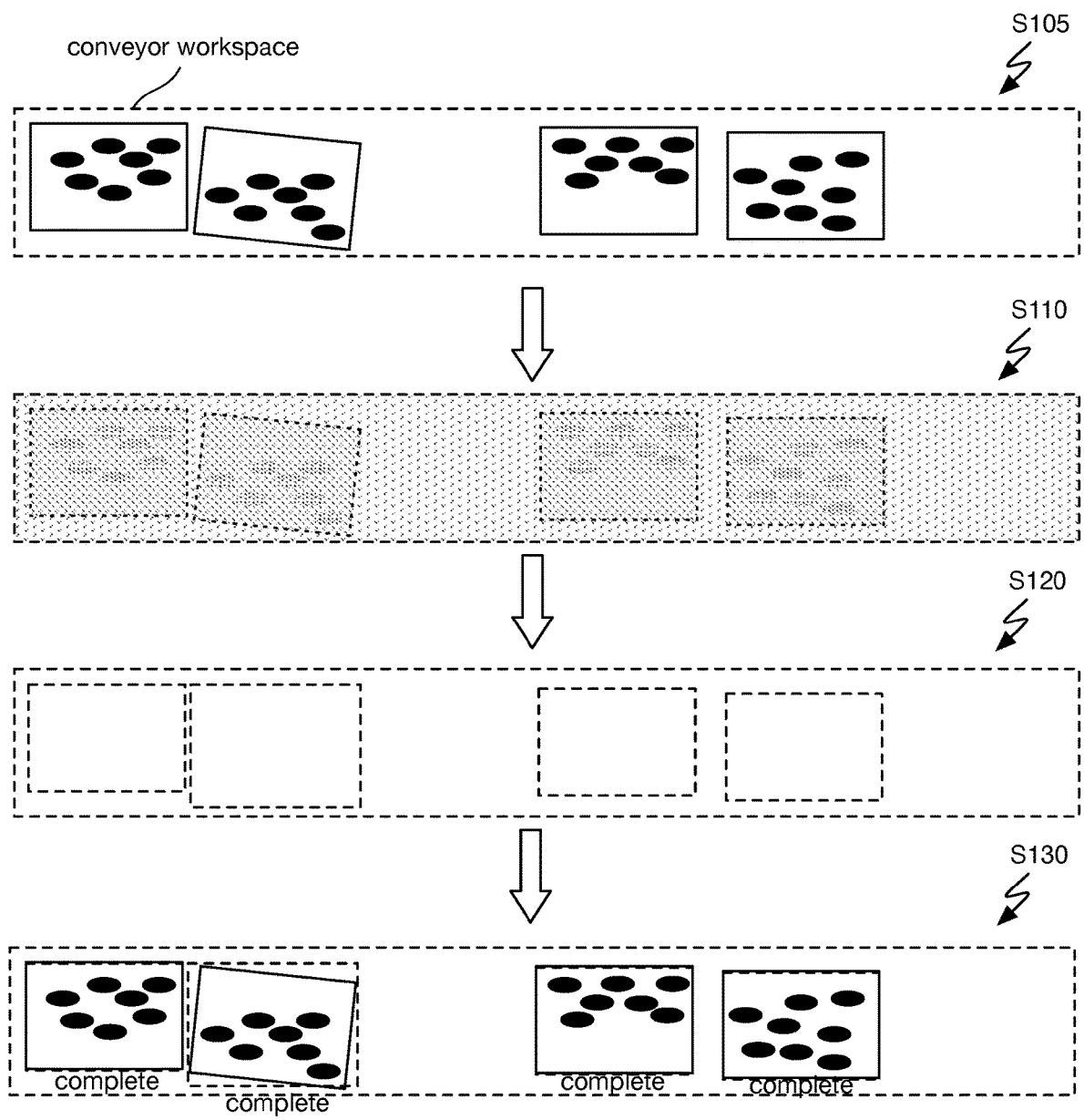
Figure 4C:
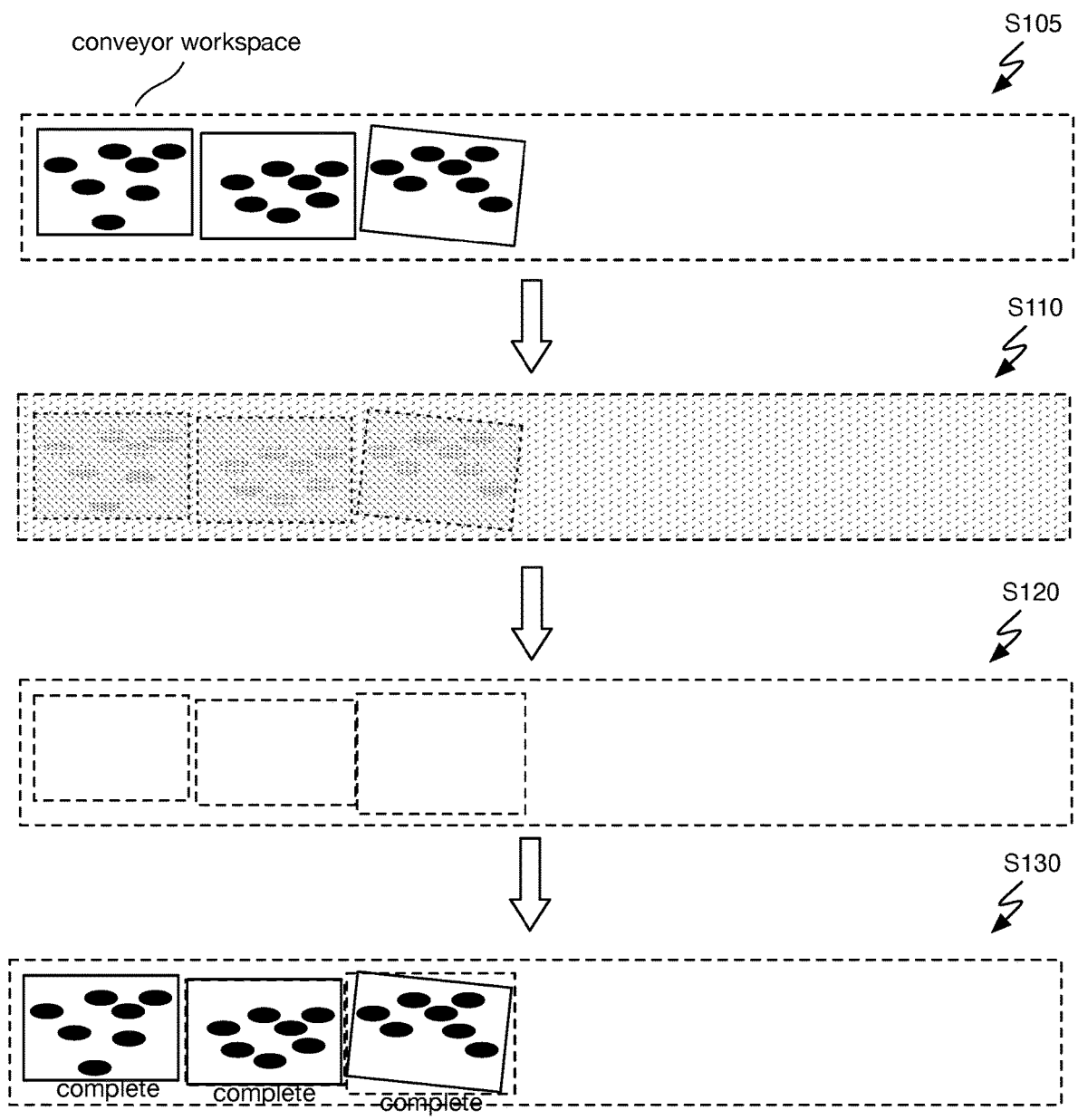
Figure 4D:
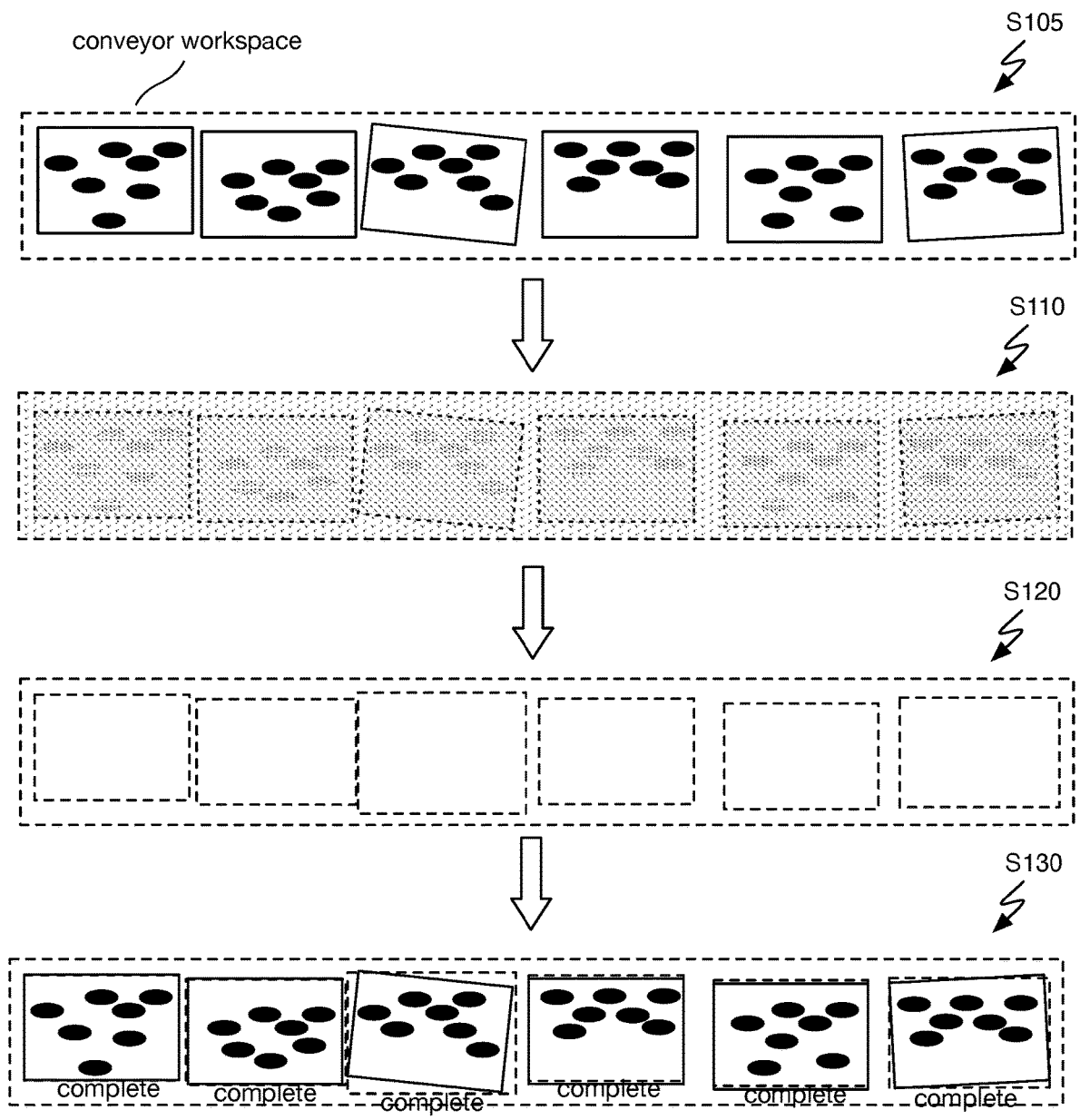
Figure 4E:
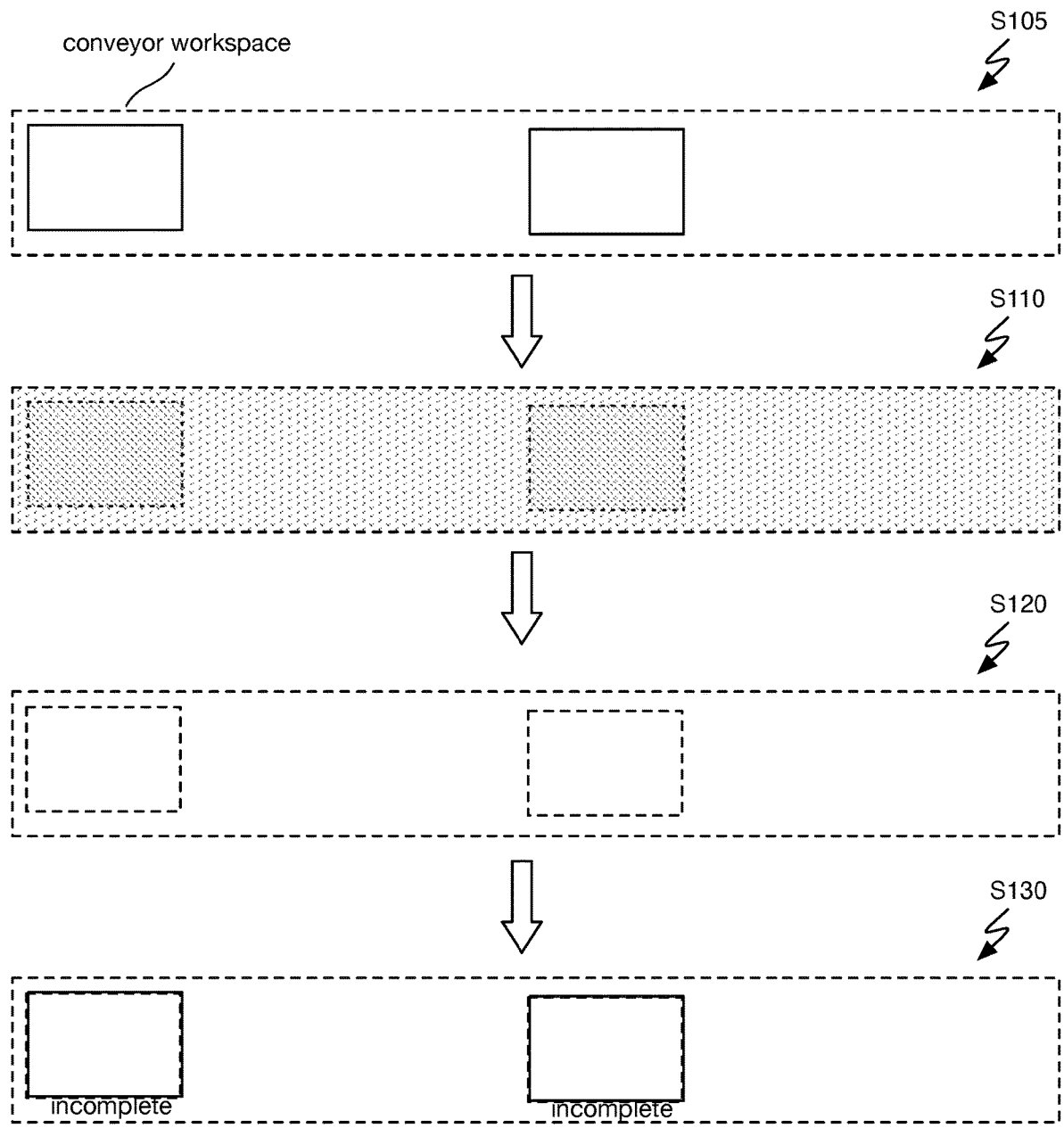
Figure 4F:
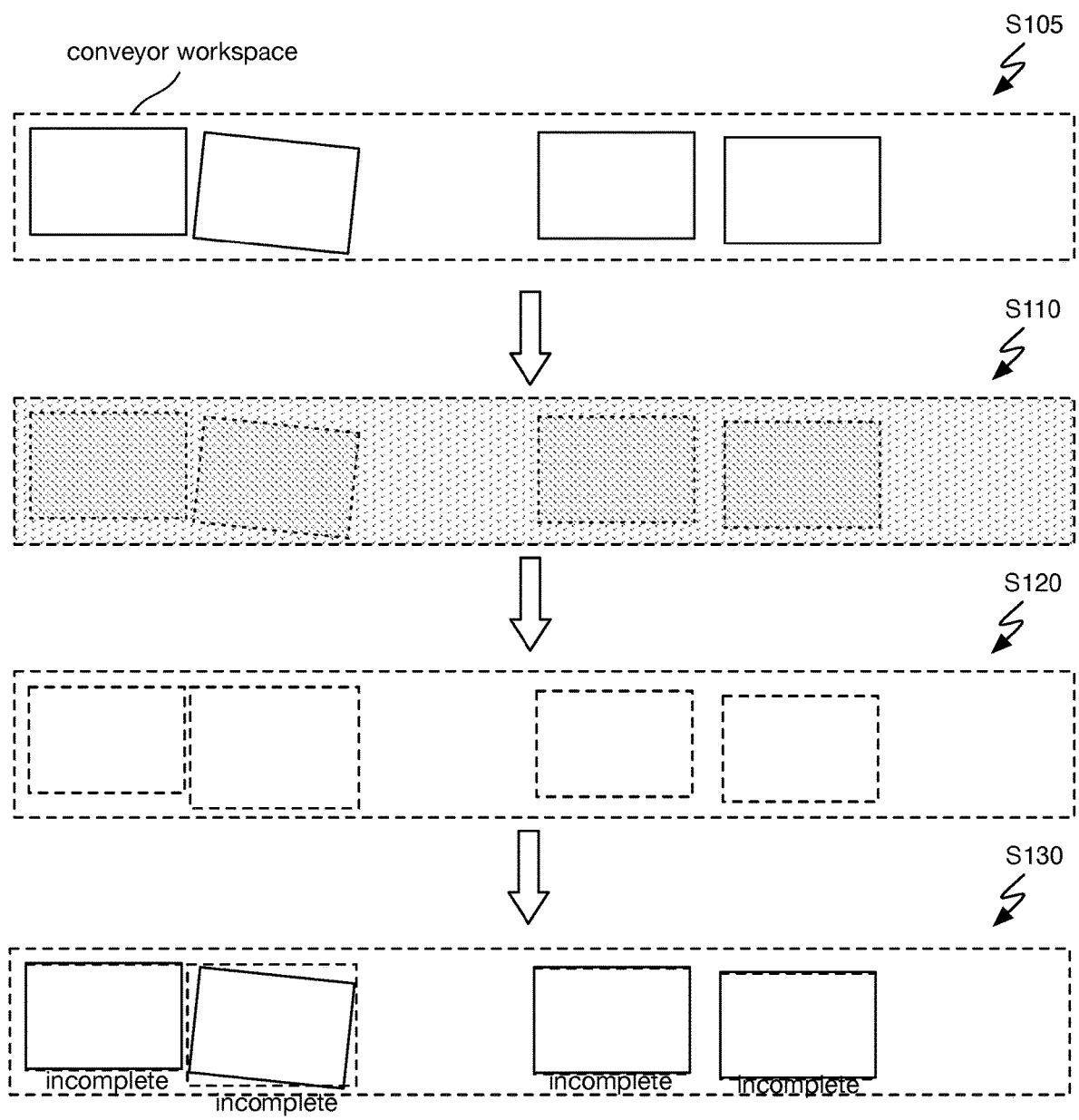
Figure 4G:
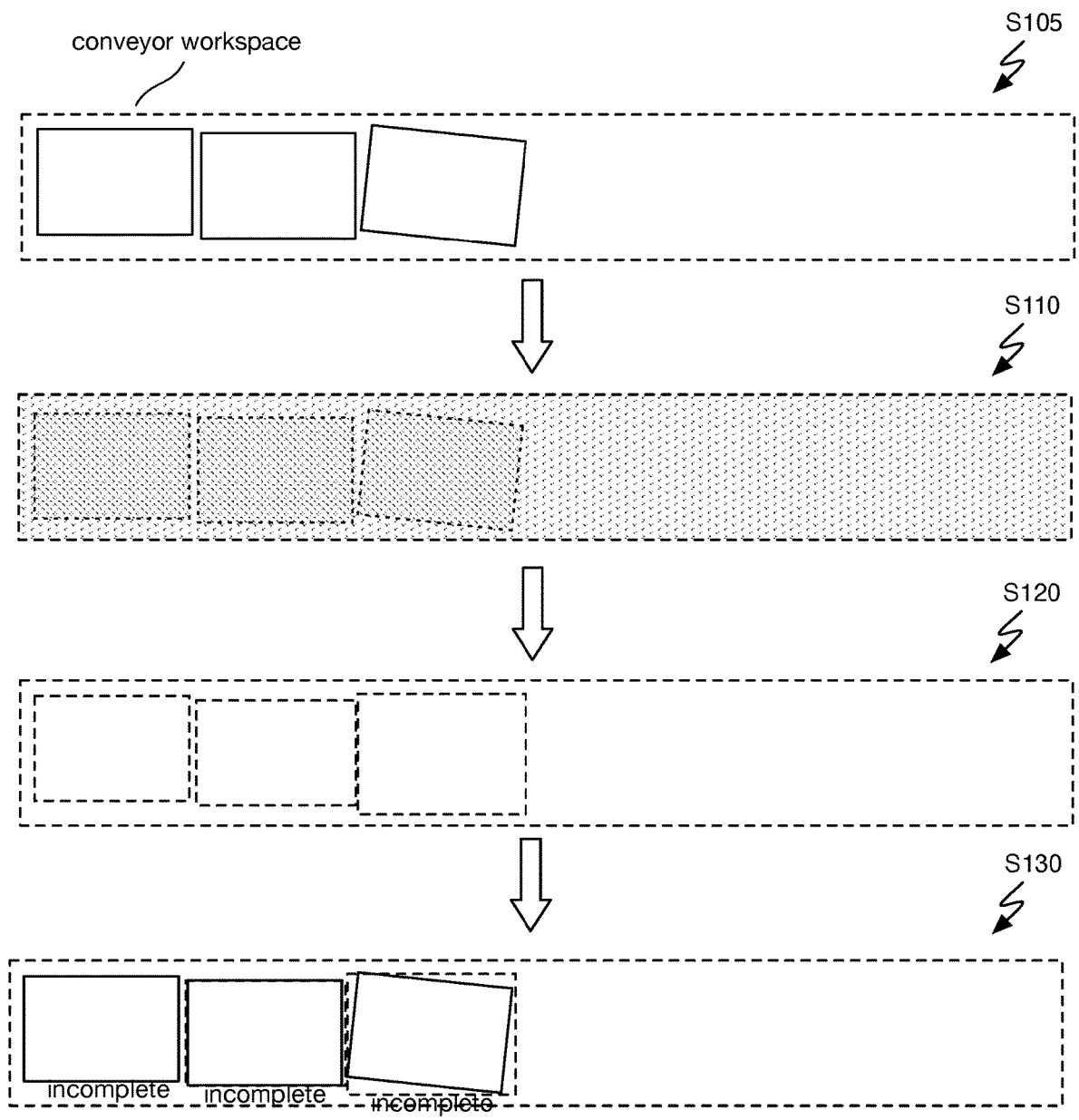
Figure 4H:
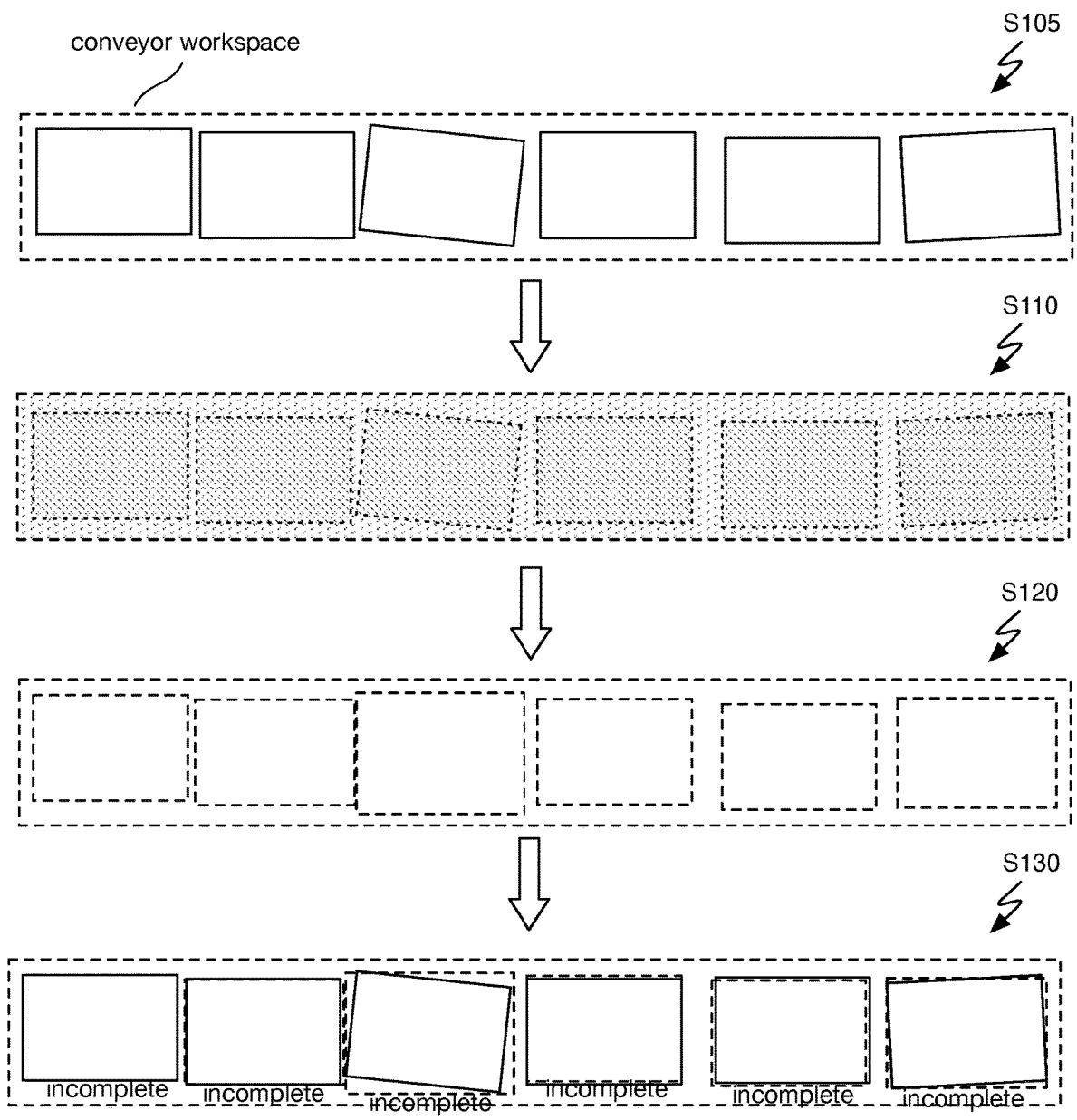

In one set of variants, bowls can be provided within the workspace in various predetermined and/or preconfigured arrangements, such as individual bowls (e.g., single bowl within the workspace and/or multiple individual bowls separated by at least a predetermined spacing, such as a bowl width; an example is shown in FIG. 4A; a second example is shown in FIG. 4E), sets of adjacent bowls (e.g., bowl pairs, bowl triplets, etc.; examples are shown in FIG. 4B, FIG. 4C, FIG. 4F, and FIG. 4G), an array of bowls spanning the workspace (e.g., examples are shown in FIG. 4D and FIG. 4H), any combination/permutation of the aforementioned arrangements and/or in any other suitable predetermined arrangements (e.g., for one or more bowl states/classifications). For instance, a predetermined a fill pattern can be alternating between complete/incomplete bowls (e.g., where a robot may be directed to place in every other bowl), serial for each classification (e.g., first set of 'incomplete' bowls followed by a set of 'complete' bowls), manually specified (e.g., prespecified at an HMI), and/or include any other suitable set of rules. In a second example, the pattern can include a bowl spacing pattern (e.g., groups of adjacent singles, doubles, triples, etc.; with a common classification; continuous line 'runs' with a single classification rule; etc.).

In a first example, bowls can be sequentially provided within the workspace in any suitable combination/permutation of the bowl arrangements/spacings illustrated in FIGS. 4A-4H. In a second example, S105 can include providing a completed bowl(s) individually within the workspace (e.g., separated from other objects/bowls on a conveyor line by at least a threshold distance); providing a pair of completed bowls within the workspace; providing a triplet of completed bowls within the workspace; providing an incomplete bowl(s) individually within the workspace; providing a pair of incomplete bowls within the workspace; and providing a triplet of incomplete bowls within the workspace. For each bowl arrangement, the conveyor line can be stationary and/or moving (e.g., continuously, during discrete time intervals, etc.) while sampling data in accordance with S110, and/or can be otherwise configured.

In a second example, the predetermined pattern can include a predefined sequence of: a first set of bowls, each defining at least a minimum separation distance to nearest respective neighbors at both ends along an axis of conveyor motion; a second set of bowls, each adjacent to a first nearest respective neighbor at a first end of the bowl along an axis of conveyor motion and defining at least the minimum separation distance to a second nearest respective neighbor at a second end opposite the first end; and a third set of bowls, each adjacent to neighboring containers at both ends of the container along an axis of conveyor motion.

In a second set of variants, bowls can be provided at an upstream portion of the workspace (e.g., relative to the translation of the conveyor) in a predetermined pattern/arrangement based on the context to facilitate data generation and/or (auto-) labeling in accordance with the method S100. As an example, bowls and detections upstream of an insertion location relative to the direction of conveyor motion (e.g., for a robot and/or manual location; where each bowl is filled at the insertion location) can be assumed to be 'incomplete', while bowls/detections downstream of the insertion location can be assumed to be 'complete'.

In a third example, the pattern can be associated with a predefined set of insertion rules of a robotic foodstuff assembly system. For example, bowls may be automatically filled with the target ingredient (e.g., in response to bowl detections or otherwise; based on the bowl detection pattern; etc.) according to a predetermined insertion rule (e.g., place in each bowl, Nth bowl, etc.).

In variants, individual bowls can be provided once, repeatedly (e.g., repeatedly passing the same bowl along the conveyor, with different orientations, spacings, etc.), with exactly one predefined classification (e.g., prefilled with the target ingredient; never completed), with multiple classifications (e.g., filled while on the conveyor; provided on the conveyor before and after ingredient insertion; etc.), and/or can be otherwise suitably provided.

Bowls provided in S105 are preferably substantially identical and/or share substantially similar attributes, such as visual appearance and/or geometric characteristics (i.e., those associated with a particular assembly context/recipe). Additionally or alternatively, bowls are preferably provided based on the assembly context (e.g., each of a predefined, finite set of bowl types associated with a recipe/skew; identical bowls associated with the assembly context), but can be otherwise provided.

However, bowls can otherwise be provided within the workspace.

Sampling sensor data for the workspace S110 functions to sample sensor data inputs which can be used for object detection/identification. Additionally or alternatively, the sensor data can be used to facilitate generation of (auto-) labeled training data to train an object classifier for the specific assembly context. Sensor data is preferably sampled periodically in accordance with a predetermined frame rate, but can alternatively be received with any other suitable timing, based on a transformation distance of objects along the conveyor, and/or with any other suitable timing/frequency. For example, image data may be collected at a standard frame rate (e.g., 30 FPS, during operation of the conveyor with bowls provided in accordance with Block S105) and downsampled to avoid overfitting to a particular configuration (e.g., reducing the number of images used for training, with or without image compression, etc.).

Imaging data is preferably sampled with sensors of the imaging system, but can alternatively be received from a set of remote/external sensors and/or any suitable set of endpoint(s). Imaging data can include: an RGB image, a depth image, a 3D image, a point cloud, and/or any other suitable imaging data. Imaging data can optionally be pre-processed based on a sensor calibration (e.g., bundle adjusted based on sensor pose, cropped to remove image regions beyond workspace, etc.), converted into standardized coordinate frame (e.g., conveyor workspace of a robotic assembly module, etc.), and/or can be otherwise suitably pre-formatted or, alternatively, not be pre-formatted.

In variants, S110 can be performed in-situ with a robotic foodstuff assembly module (e.g., registered pose/arrangement relative to a conveyor line and/or in a particular configuration). Additionally or alternatively, S110 can be performed by a separate/external system and/or using any other suitable imaging sensors/systems.

However, sensor data can be otherwise sampled/determined, and/or any other suitable sensor data can be used to facilitate other portions of the method.

Detecting bowls based on the sensor data S120 functions to identify the bowl instance(s) within the sensor data, which can be used to tag/label bowls within the training dataset. Bowls are preferably detected/identified from an individual image representation/frame of the imaging data received in S110, but can alternatively be generated with and/or tracked across multiple representations (e.g., a combination of point clouds and/or images captured within a single timestep, etc.) and/or multiple frames of imaging data (e.g., estimating object pose with an object tracker). The bowls are preferably detected using the object detector (e.g., a generalized 3D object detector), but can be detected based on heuristic processes, depth image filtering, and/or any other suitable object detection techniques. In a specific example, bowls can be detected via one or more of the bowl detection processes as described in U.S. application Ser. No. 17/881,475, filed 4 Aug. 2022, which is incorporated herein in its entirety by this reference.

Bowl detection in S120 is preferably based on the image data (e.g., using the sampled imaged data from S110 as an input), and can be performed synchronously, contemporaneously, and/or asynchronously (e.g., subsequently) with image data sampling. For example, bowl detection can be performed during a bowl provision sequence and corresponding imaging (e.g., where analysis may be performed locally) and/or may be subsequently performed (e.g., remotely, via remote analysis/processing, etc.). In variants, bowl detection may be performed based on a first subset of data (e.g., 3D point cloud) to facilitate labeling of a second subset of data (e.g., 2D RGB and/or depth image data).

S120 preferably includes determining a pose estimate for each bowl instance in a sensor coordinate frame based on the sampled images. The container pose estimate can include a bounding box (e.g., 2D, 2.5D, 3D, etc.; defined from max/min positions for a set of orthogonal axes; axis aligned, not axis aligned, etc.), a set of identified key points (e.g., corner point, center point of a circular bowl, centroid, etc.), a 2D pose estimate, a 2.5D pose estimate (e.g., under an assumption of planarity), a 3D pose estimate, a primary axis, and/or any other suitable pose estimate(s). The pose estimate for each bowl is preferably determined as an object pose estimate output of the object detector (e.g., an example is shown in FIGS. 4A-4H), but can be otherwise suitably determined.

However, bowls can be otherwise detected to facilitate (auto-)labeling in S130 and/or training in S140.

Determining a labeled training dataset S130 functions to tag or label objects within the dataset sampled in S110, which can be used to facilitate classifier training for the specific assembly context in S140. The labeled training dataset is preferably generated automatically by tagging or labeling objects (e.g., bowls) detected in S120 based on the predetermined configuration corresponding to the bowl provision S105 (e.g., where each object is labeled with the predetermined configuration, treating the predetermined configuration as apriori knowledge). For example, the objects can be tagged with a binary classification label according to the predetermined configuration which distinguishes between complete/incomplete bowls, or can be otherwise tagged/labeled (e.g., semantic label, multi-class label, etc.). Objects can be labeled/tagged individually, where each bowl object within the scene is provided a unique label in association with an instance ID or index, or collectively based on the pattern (e.g., a unitary label/tag for the image indicating that all objects are complete/incomplete; a unitary label associated with the predetermined configuration/pattern of bowl provisions in S105, etc.). However, S130 can additionally or alternatively include supervised, human verification of object detections and/or classification labels (e.g., using an HMI, via a remote verification/validation system, etc.), supplementation of automatically labeled training data with manually labeled/generated data and/or pre-existing data (e.g., where prior data for a particular object class already exists, such as an empty bowl of the same type on the same conveyor line; generated by a previous iteration of S105, S110, and/or S120; etc.), inferred labels (e.g., inferring that an ingredient was placed in the bowl based on a change in bowl interior appearance after the robot position), based on a priori knowledge (e.g., known ingredient-robot assignment, etc.), and/or can be otherwise determined.

Figure 4I:
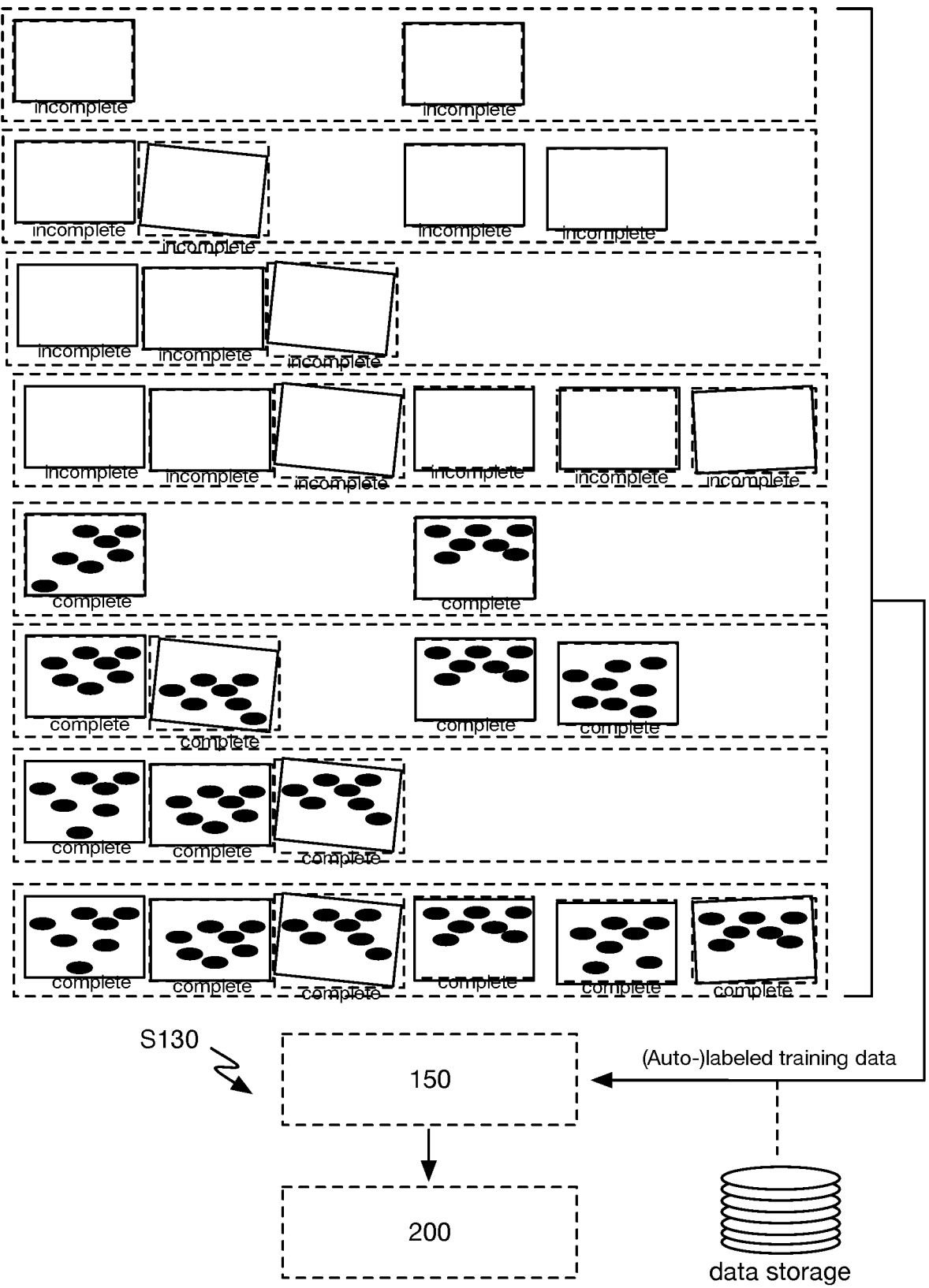
FIG. 4I is an example diagram of training a classifier based on auto-labeled training data in one or more variants of the method.

The labeled training dataset preferably includes 2D image data (e.g., RGB image frames and/or sequences of RGB image frames) which are aggregated with the bowl detections (e.g., pose estimates, 2D bounding box, etc.; an example is shown in FIG. 4I) generated in S120 and tagged/labeled with a (predetermined) classification based on the pattern(s) and/or arrangements of bowl provisions in S105 (e.g., where the pattern is treated as a priori knowledge). However, the labeled training dataset can additionally include depth image data (e.g., 2D RGB-depth image frames), and/or any other suitable imaging data.

The labeled training dataset is preferably specific to an assembly context. The assembly context can include or be associated with: a recipe and/or a target ingredient or assembly step thereof (e.g., rice insertion; inserting carrot chunks upon an existing set of ingredients, etc.), a particular bowl style (e.g., size, geometry, color, shape, manufacturer model/specifications, etc.), a module registration/configuration relative to a conveyor (e.g., sensor coordinate frame relative to the conveyor; pose of robotic assembly module; etc.), lighting conditions, a machine workspace along a conveyor line, a position along a conveyor line, a conveyor line configuration parameters (e.g., color, width, height, number of lanes; conveyors with guards for container alignment; indexed conveyors, continuous conveyors, stop-and-go conveyors, etc.), and/or any other suitable assembly context parameters. In a specific example, the labeled training dataset can be specific to a target ingredient, bowl style, and conveyor configuration. The object labels/tags within the training dataset can optionally include context parameters associated with the predetermined assembly context (e.g., bowl type, assembly line parameters, etc.) and/or the training dataset can be stored, indexed, or referenced in association with the context, or can be otherwise specific to the context. Additionally or alternatively, the training dataset can be otherwise indexed and/or used to train any suitable context-specific or generalized models (e.g., object detectors). However, the labeled training dataset can include any other suitable data.

In variants, the training dataset can additionally or alternatively be updated and/or (synthetically) modified/adapted to include occluded image frames. For example, during runtime operation/deployment, imaging sensors may be obstructed/occluded by a robot arm and/or food utensil during robotic assembly, and it may therefore improve resilience and/or detection accuracy to train the object classifier at least partially based on occluded workspace scenes. Accordingly, the training dataset can be expanded to include partially masked image frames (e.g., masking portions of image frames based on historical data; excluding portions of the RGB data with depth values above a threshold height; synthetically overlaying arm images over a portion of segmented image regions; etc.). However, the training dataset may otherwise incorporate occlusions associated with arm operation (e.g., where the arm is operated within the workspace while sampling sensor data S110, etc.) and/or may neglect occluded image frames entirely. Additionally or alternatively, image frames and/or sequences of labeled image frames can be cropped, spliced, rectified, adjusted (e.g., based on a bundle adjustment), transformed (e.g., rotated, mirrored, etc.), masked, and/or otherwise processed during S130.

However, labeled training dataset(s) can be otherwise determined and/or any other suitable labeled data can be used to facilitate training via S140.

Training a classifier for the assembly context S140 functions to generate a trained bowl classifier (e.g., which may facilitate runtime classification in accordance with Block S200). The classifier is preferably a prebuilt classification network or model (e.g., YOLO detector/classifier) which is trained for the specific assembly context using the labeled training dataset (e.g., training specific weights and parameter values for the assembly context). The classifier is preferably trained to receive sensor data inputs (e.g., in the form of 2D image data; RGB data and/or depth image data) and generate a classification output (e.g., binary classification, multi-class classification; in the form of a classification probability and/or score; etc.). The classifier is preferably an integrated object detector/classifier, but can alternatively be configured to operate with a separate object detector and/or object tracker (e.g., receiving object pose parameters as an input) and/or can be otherwise configured.

The classifier is preferably trained remotely (e.g., via cloud and/or remote data processing; an example is shown in FIG. 6), but can additionally or alternatively be trained locally (e.g., onboard the machine), and/or processing for S140 can be otherwise performed. In an example, the system 100 can (auto-)label training data and upload the training dataset to remote data storage, and a training module (e.g., local, remote, distributed) can generate a trained bowl classifier for the specific assembly context. The trained bowl classifier can be utilized at an individual foodstuff assembly module (e.g., used to generate the training dataset) and/or a plurality of assembly modules operating in the same context (e.g., an example is shown in FIG. 7).

However, the (bowl) classifier can be otherwise trained for the assembly context and/or a trained classifier can be otherwise generated.

Figure 3B:
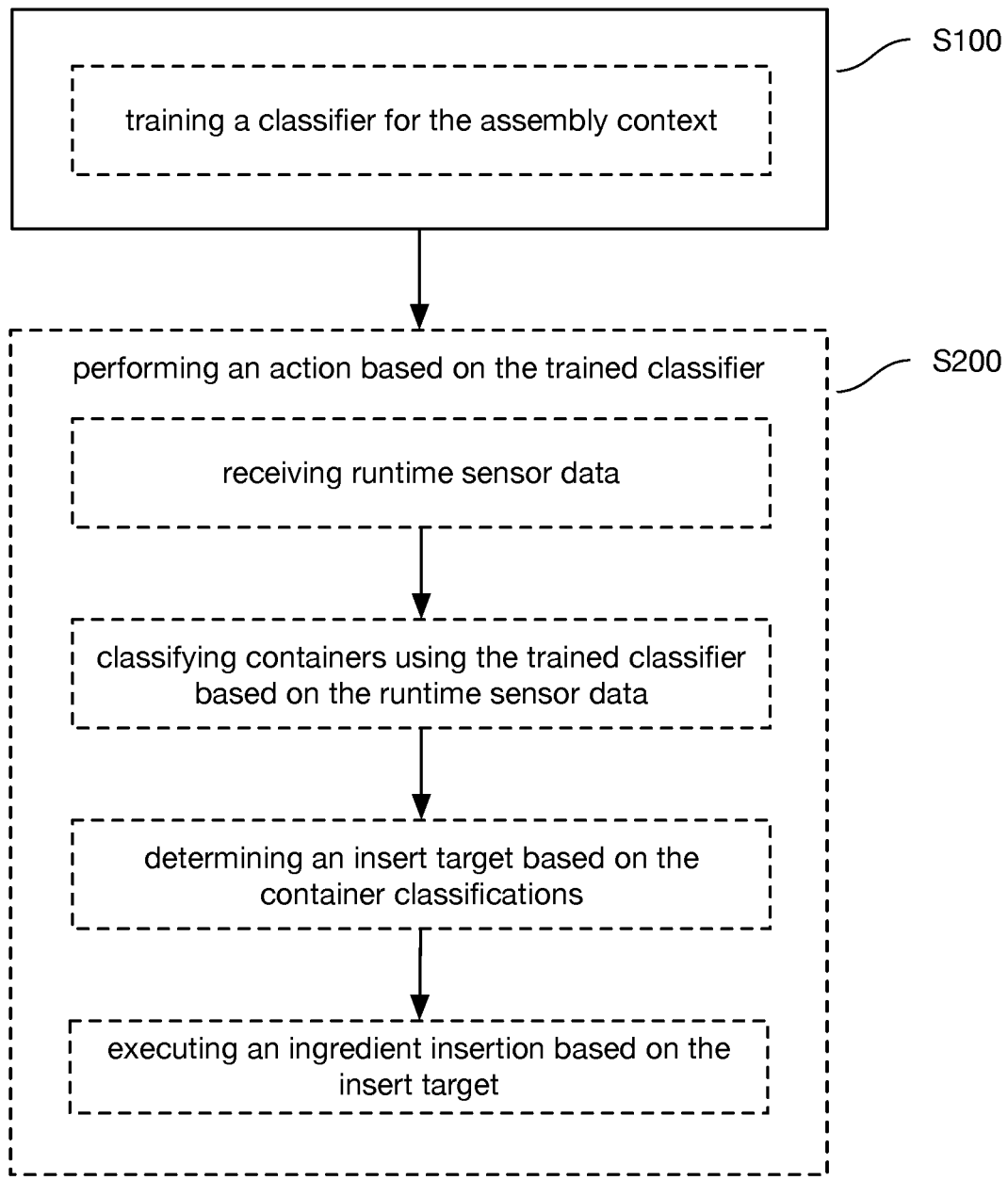
FIG. 3B is a flowchart diagram of a variant of the method.

The method can optionally include or be used in conjunction with performing an action based on the trained classifier S200 (e.g., an example is shown in FIG. 3B). Actions can include: insertion scheduling, target selection (e.g., selecting a bowl for ingredient selection), trajectory planning, robot control, and/or any other suitable actions. In one set of variants, S200 can include: receiving runtime sensor data (e.g., second set of runtime imaging data collected by the imaging system; collected by the same process as S110 or a different process/system), classifying containers using the trained classifier based on the runtime sensor data, determining an insert target based on the container classifications, executing an ingredient insertion based on the insert target. In variants, S200 can include and/or can be used in conjunction with any of the actions/steps as described in U.S. application Ser. No. 17/881,475, filed 4 Aug. 2022, and/or U.S. application Ser. No. 18/075,961, filed 6 Dec. 2022 each of which is incorporated herein in its entirety by this reference.

Figure 2:
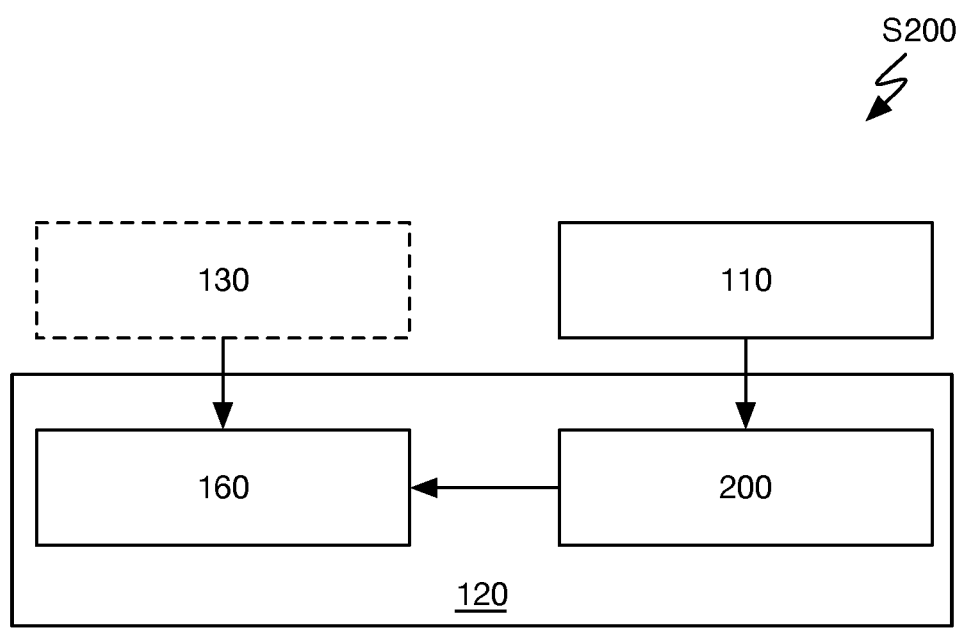
FIG. 2 is a schematic representation of a variant of the system.
Figure 5:
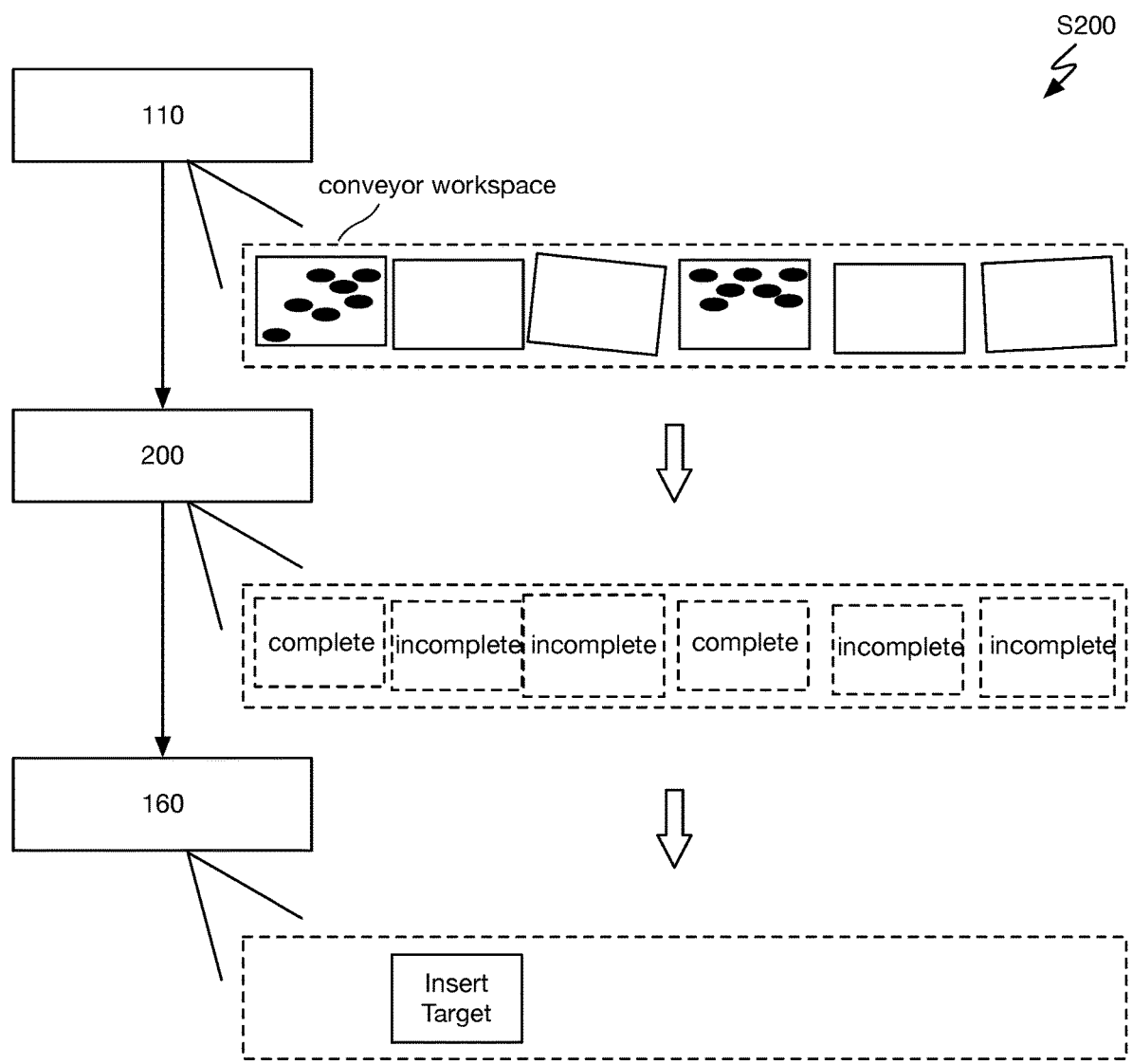
FIG. 5 is a diagrammatic example of runtime execution of ingredient insertion using a trained classifier in one or more variants of the method.

In one set of variants (e.g., a first example is shown in FIG. 2, a second example is shown in FIG. 5), in a runtime configuration, the trained bowl classifier (e.g., trained via S100) can receive images of a conveyor workspace from the imaging system and output a classification (and/or classification probability) for a plurality of bowls detected within the conveyor workspace. The output of the bowl classifier can be used by a controller to facilitate insertion at an insertion target, selected based on the bowl classifications output by the trained bowl classifier.

However, any other suitable actions can be performed based on the trained bowl classifier and/or the trained bowl classifier can be otherwise suitably deployed in a runtime operation setting for the assembly context.

Alternative embodiments implement the above methods and/or processing modules in non-transitory computer-readable media, storing computer-readable instructions. The instructions can be executed by computer-executable components integrated with the computer-readable medium and/or processing system. The computer-readable medium may include any suitable computer readable media such as RAMs, ROMs, flash memory, EEPROMs, optical devices (CD or DVD), hard drives, floppy drives, non-transitory computer readable media, or any suitable device. The computer-executable component can include a computing system and/or processing system (e.g., including one or more collocated or distributed, remote or local processors) connected to the non-transitory computer-readable medium, such as CPUs, GPUs, TPUS, microprocessors, or ASICs, but the instructions can alternatively or additionally be executed by any suitable dedicated hardware device.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method for context-specific classification of containers along a conveyor line in an assembly context, the assembly context associated with a container appearance and a target ingredient for insertion into the containers, the context-specific classification comprising a binary classification of target ingredient presence within a respective container, the method comprising: generating a set of context-specific training data for the assembly context by automatically labeling segmented image regions of containers with the binary classification according to a predetermined pattern; with the set of context-specific training data, training a context-specific classification model to predict the binary container state for containers in the assembly context; with the context-specific classification model, determining a set of binary container state predictions for identified containers in the assembly context; and based on the binary container state predictions, controlling a robot to insert the target ingredient into at least a subset of the identified containers, wherein the context-specific classification model comprises: a first neural network model comprising a first convolutional neural network (CNN) backbone with a first classification head; a second neural network model comprising a second CNN backbone with a second classification head; and a third neural network model, wherein training the context-specific classification model comprises updating weights of the first CNN backbone, first classification head, and second classification head based on the context-specific training data.

2. The method of claim 1, wherein generating a set of context-specific training data for the assembly context comprises:
   providing containers along the conveyor line in a predetermined pattern, ordered by binary classification of the target ingredient presence,
   with an imaging system above the workspace, periodically collecting images of the workspace contemporaneously with a period of conveyor motion;
   with a pretrained object detector, detecting the containers within the images and segmenting an image region for each detected container; and
   automatically labeling the segmented image region for each detected container with the binary classification according to the predetermined pattern.

3. The method of claim 2, wherein the predetermined pattern comprises a predefined sequence of:
   a first set of containers, each defining at least a minimum separation distance to nearest respective neighbors at both container ends along an axis of conveyor motion;
   a second set of containers, each adjacent to a first nearest respective neighbor at a first end of the container along an axis of conveyor motion and defining at least the minimum separation distance to a second nearest respective neighbor at a second end opposite the first end; and
   a third set of containers, each adjacent to neighboring containers at both ends of the container along an axis of conveyor motion.

4. The method of claim 2, wherein the predetermined pattern comprises a pattern of manual provisions of the target ingredient for the assembly context.

5. The method of claim 2, wherein the container appearance corresponds to an appearance of a predefined container geometry and at least one pre-inserted ingredient which is different from the target ingredient.

6. The method of claim 2, wherein the predetermined pattern comprises a predefined container spacing along an axis of conveyor motion.

7. The method of claim 2, wherein the predetermined pattern comprises a sequence of containers ordered by binary container state.

8. The method of claim 7, wherein at least one pair of the segmented image regions are partially overlapping.

9. The method of claim 2, wherein the context-specific classification model comprises a first neural network classification head, trained with the context specific training data, and a second classification subnetwork which is pretrained to determine a second binary container state prediction for each of the set of containers based on single shot image comparison.

10. The method of claim 9, wherein the second classification subnetwork comprises a Siamese neural network.

11. The method of claim 2, wherein the context-specific classification model comprises an ensemble of neural network classifiers, wherein at least one of the neural network classifiers is trained using the set of context-specific training data.

12. The method of claim 11, wherein second CNN backbone is pretrained with a generalized set of training data, wherein the generalized set of training data and the set of context-specific training data are disjoint.

13. The method of claim 2, wherein the imaging system comprises a depth imaging sensor, wherein the pretrained object detector is configured to detect the containers using depth imaging data, wherein the context-specific classification model is trained with 2D images.

* * * * *